(12) United States Patent
Chang

(10) Patent No.: US 12,486,115 B2
(45) Date of Patent: Dec. 2, 2025

(54) SYSTEM AND METHOD FOR CONTROLLING CONVEYOR SYSTEM TENSION

(71) Applicant: FPS Food Process Solutions Corp., Richmond (CA)

(72) Inventor: Kin Hung Jeffrey Chang, Richmond (CA)

(73) Assignee: FPS Food Process Solutions Corp., Richmond (CA)

( * ) Notice: Subject to any disclaimer, the term of this patent is extended or adjusted under 35 U.S.C. 154(b) by 222 days.

(21) Appl. No.: 18/267,006

(22) PCT Filed: Sep. 10, 2021

(86) PCT No.: PCT/CA2021/051251
§ 371 (c)(1),
(2) Date: Jun. 13, 2023

(87) PCT Pub. No.: WO2022/126235
PCT Pub. Date: Jun. 23, 2022

(65) Prior Publication Data
US 2024/0059494 A1 Feb. 22, 2024

Related U.S. Application Data

(60) Provisional application No. 63/125,787, filed on Dec. 15, 2020.

(51) Int. Cl.
*B65G 23/44* (2006.01)
*B65G 43/00* (2006.01)

(52) U.S. Cl.
CPC ............. *B65G 23/44* (2013.01); *B65G 43/00* (2013.01)

(58) Field of Classification Search
None
See application file for complete search history.

(56) References Cited

U.S. PATENT DOCUMENTS 5,505,293 A * 4/1996 Ochs ...................... B65G 21/18
198/810.04
5,743,376 A * 4/1998 Ochs ...................... B65G 21/18
198/848

(Continued)

FOREIGN PATENT DOCUMENTS

BE 1027257 B1 12/2020

OTHER PUBLICATIONS

Notification Concerning Submission, Obtention or Transmittal of Priority Document for International Application No. PCT/CA2021/051251 dated Sep. 27, 2021.

(Continued)

*Primary Examiner* — William R Harp
(74) *Attorney, Agent, or Firm* — Neal, Gerber & Eisenberg LLP

(57) ABSTRACT

A method for controlling tension in a belt of a conveyor system. The method involves: driving the belt along a path from an intake region to a discharge region using an intake motor adjacent the intake region and a discharge motor adjacent the discharge region; measuring a tension in the belt using an intake belt sensor that moves with the belt proximate the intake region to generate an intake belt signal; measuring a tension in the belt using a discharge belt sensor that moves with the belt proximate the discharge region to generate a discharge belt signal; monitoring the intake and discharge belt signals; and adjusting at least one of the intake motor and the discharge motor based on the intake and discharge belt signals to maintain the tensions in the belt within a pre-defined range.

32 Claims, 9 Drawing Sheets

(56) References Cited

U.S. PATENT DOCUMENTS

| | | |
|---|---|---|
| 7,494,004 B2 | 2/2009 | Stolyar et al. |
| 7,635,060 B2 | 12/2009 | Lagneaux |
| 8,839,948 B2 | 9/2014 | Landrum et al. |
| 9,527,673 B2 | 12/2016 | Bogle et al. |

OTHER PUBLICATIONS

International Search Report and Written Opinion for International Application No. PCT/CA2021/051251 dated Nov. 15, 2021.
Extended European Search Report for Application No. 21904695.0 dated Oct. 28, 2024.

* cited by examiner

SYSTEM AND METHOD FOR CONTROLLING CONVEYOR SYSTEM TENSION

PRIORITY CLAIM

This application is a national stage application of PCT/CA2021/051251, filed on Sep. 10, 2021, which claims the benefit of and priority to U.S. Provisional Patent Application No. 63/125,787, filed on Dec. 15, 2020, the entire contents of which are each incorporated by reference herein.

FIELD

Embodiments described herein relate generally to a method and a system for controlling conveyor system tension, and more particularly a method and system for controlling tension in a belt of the conveyor system.

BACKGROUND

Endless conveyor systems which utilize a central drum involve driving a belt from an intake region through a conveyor stack helically winding up (or down) a periphery of the drum to a discharge region, and then from the discharge region back to the intake region. Tension in the belt of such conveyor systems may be quite high, due to the curved shape of the periphery of the drum and the need to transition from substantially linear configurations in the intake and discharge regions to the curved configuration in the helical conveyor stack for example. Belts which are over-tensioned may be prone to damage and wear or may lead to belt skipping as the belt may be too taunt to engage with the periphery of the drum. On the other hand, belts which are under-tensioned may lead to disengagement and slipping when the belt is too slack to engage the periphery of the drum and belt surging when the belt has insufficient tension to overcome frictional forces within the conveyor system. Under-tensioned belts may also sag when product is placed on the belt.

Tension in the belt may also change depending on the location of the belt within the conveyor system. The tension in a portion of the belt when in the intake and discharge regions may be different from the tension in that same portion of the belt when in the helical conveyor stack. Further still, tension in the belt may change during operation of the conveyor system, and a relatively clean belt at the beginning of operation may have a different tension than a relatively used belt at the end of operation having ice, product or other debris adhered thereto.

Current systems for adjusting and maintaining tension in a belt in a helical conveyor system may not be sufficiently sensitive and responsive.

SUMMARY

In one embodiment, there is provided a method for controlling tension in a belt of a conveyor system. The method involves: driving the belt along a path from an intake region to a discharge region using an intake motor adjacent the intake region and a discharge motor adjacent the discharge region; measuring a tension in the belt using an intake belt sensor that moves with the belt proximate the intake region to generate an intake belt signal; measuring a tension in the belt using a discharge belt sensor that moves with the belt proximate the discharge region to generate a discharge belt signal; monitoring the intake and discharge belt signals; and adjusting at least one of the intake motor and the discharge motor based on the intake and discharge belt signals to maintain the tensions in the belt within a pre-defined range.

In another embodiment, there is provided a conveyor system including: a belt movable along a path from an intake region to a discharge region; an intake motor adjacent the intake region and a discharge motor adjacent the discharge region engageable with the belt to drive the belt along the path; an intake belt sensor that moves with the belt proximate the intake region and a discharge belt sensor that moves with the belt proximate the discharge region, the intake and discharge belt sensors measuring tensions in the belt to generate intake and discharge belt signals; and a control system for receiving the intake and discharge belt signals. The control system is configured to: generate adjustment signals for adjusting at least one of the intake motor and the discharge motor based on the intake and discharge belt signals to maintain the tensions in the belt within a pre-defined range; and transmit the adjustment signals to the at least one of the intake motor and the discharge motor.

BRIEF DESCRIPTION OF THE DRAWINGS

Further features and advantages of the present disclosure will be apparent from the following description of a non-limiting embodiment thereof, with reference to the Figures of the accompanying drawings, wherein.

DETAILED DESCRIPTION

Figure 1:
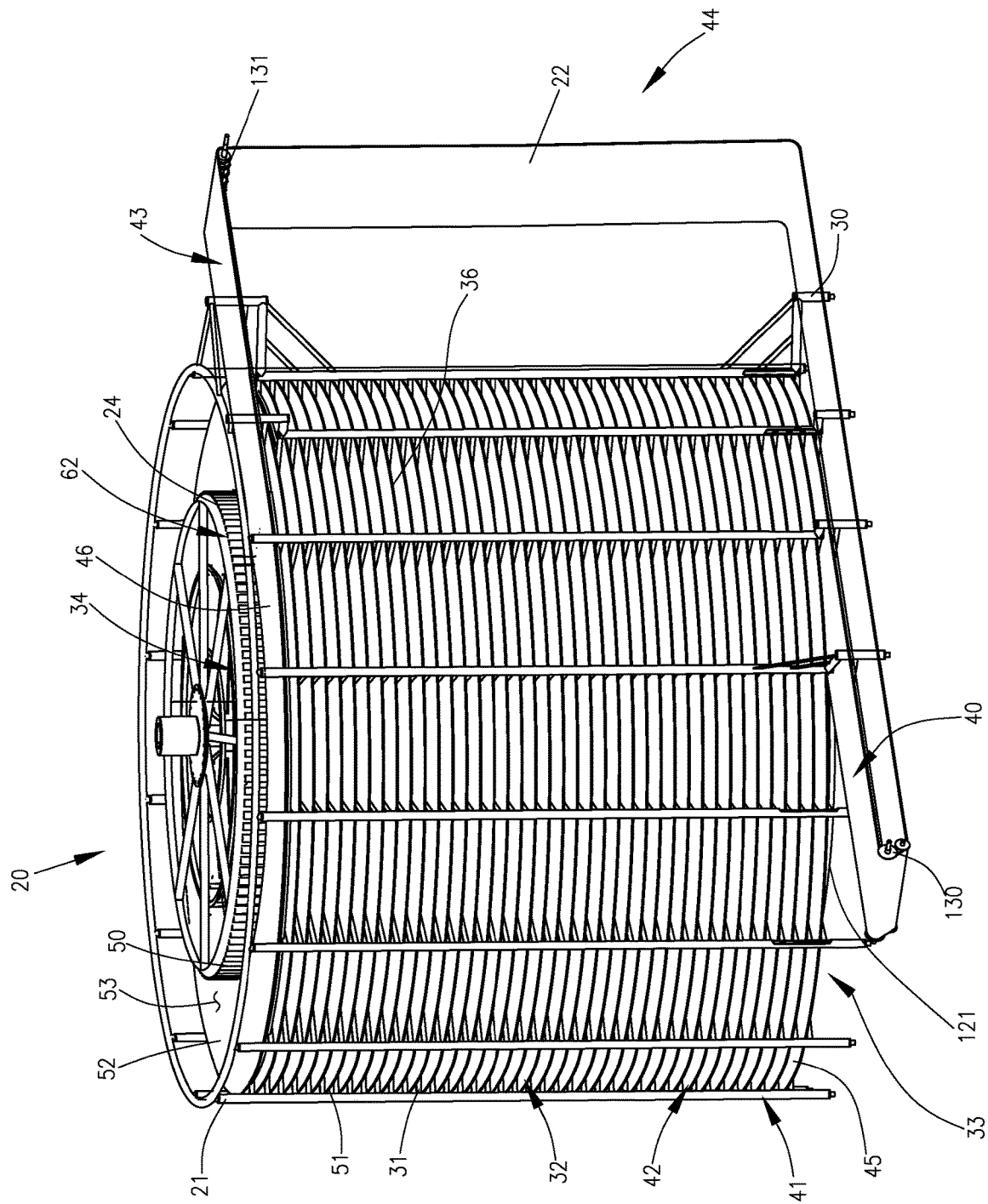
FIG. 1 is a perspective view of a conveyor system in accordance with one embodiment.
Figure 2:
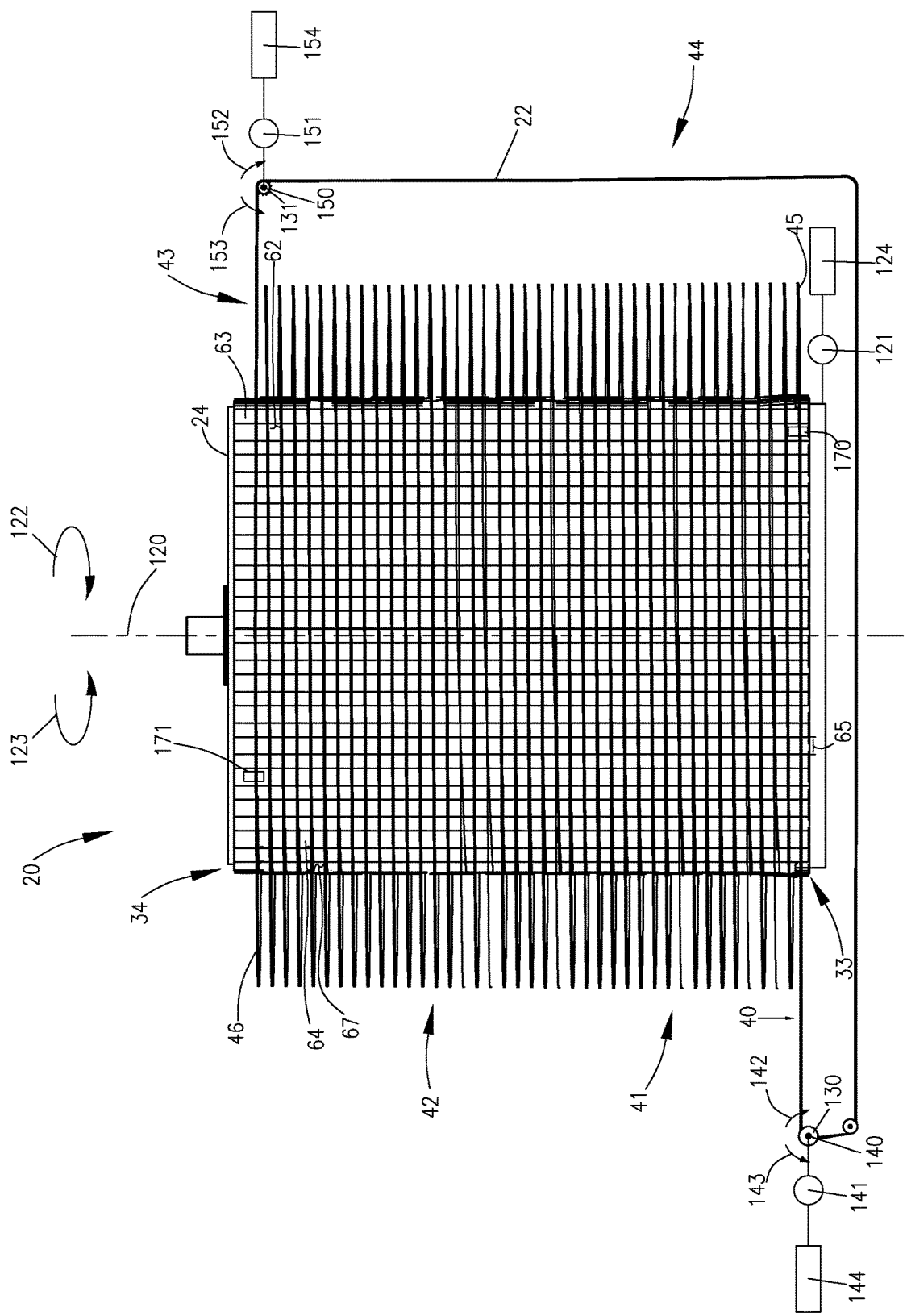
FIG. 2 is a side elevation schematic of the conveyor system shown in FIG. 1.

Referring to FIGS. 1 and 2, a conveyor system in accordance with one embodiment is shown generally at 20. In this embodiment, the conveyor system 20 includes a support structure 21, a belt 22 and a drum 24.

Best seen in FIG. 1, the support structure 21 includes an outer frame 30 and a plurality of tier supports 31 coupled to and supported by the outer frame 30. The tier supports 31 extend from the outer frame 30 towards the drum 24 and form a carryway 32 around the drum 24. In the embodiment shown, the carryway 32 forms a path between an upper end 34 and a lower end 33 of the drum 24. In the embodiment shown, the carryway 32 forms a helical travel path due to a cylindrical shape of a periphery 62 of the drum 24. In other embodiments (not shown), the carryway 32 may have a different configuration depending on a shape of the drum 24, such as an angled path in embodiments where the drum 24 is rectangular.

In the embodiment shown, the tier supports 31 comprises inner and outer rails 36 configured to support the belt 22. In certain embodiments, the inner and outer rails 36 include respective wear strips (not shown) mounted thereon which contact a bottom of the belt 22. The wear strips may reduce friction during movement of the belt 22 along the carryway 32 and may also reduce wear to the rails 36 from movement of the belt 22.

Referring to FIGS. 1 and 2, the belt 22 may be an endless conveyor belt which loops back on itself. For example, in the embodiment shown, the belt 22 has a travel path from a lower intake region 40 where product can be placed onto the belt 22 to a conveyor stack 41 around the drum 24 having a plurality of tiers 42 supported by the tier supports 31. The belt 22 thus transitions from a substantially linear configuration in the intake region 40 into a first tier 45 of the tiers 42 to form a curved configuration of the conveyor stack 41 as guided by the tier supports 31. The travel path of the belt 22 then moves through the conveyor stack 41 from the lower end 33 to the upper end 34 of the drum 24, as guided by the tier supports 31. The belt 22 then exits the conveyor stack 41 via a final tier 46 of the tiers 42 to an upper discharge region 43 where product can be removed from the belt 22. The belt 22 transitions out of the curved configuration of the final tier 46 and back into the substantially linear configuration in the discharge region 43. The belt 22 then travels from the discharge region 43, through a linking region 44 and back to the intake region 40. In other embodiments (not shown), this travel path may be reversed, such that the belt 22 is fed into the conveyor stack 41 from the upper discharge region 43 and pulled out of the conveyor stack 41 from the lower intake region 40, before the belt 22 travels back to the discharge region 43 through the linking region 44. In yet other embodiments (not shown), the belt 22 may travel through additional or fewer regions and components of the conveyor system 20.

Figure 3:
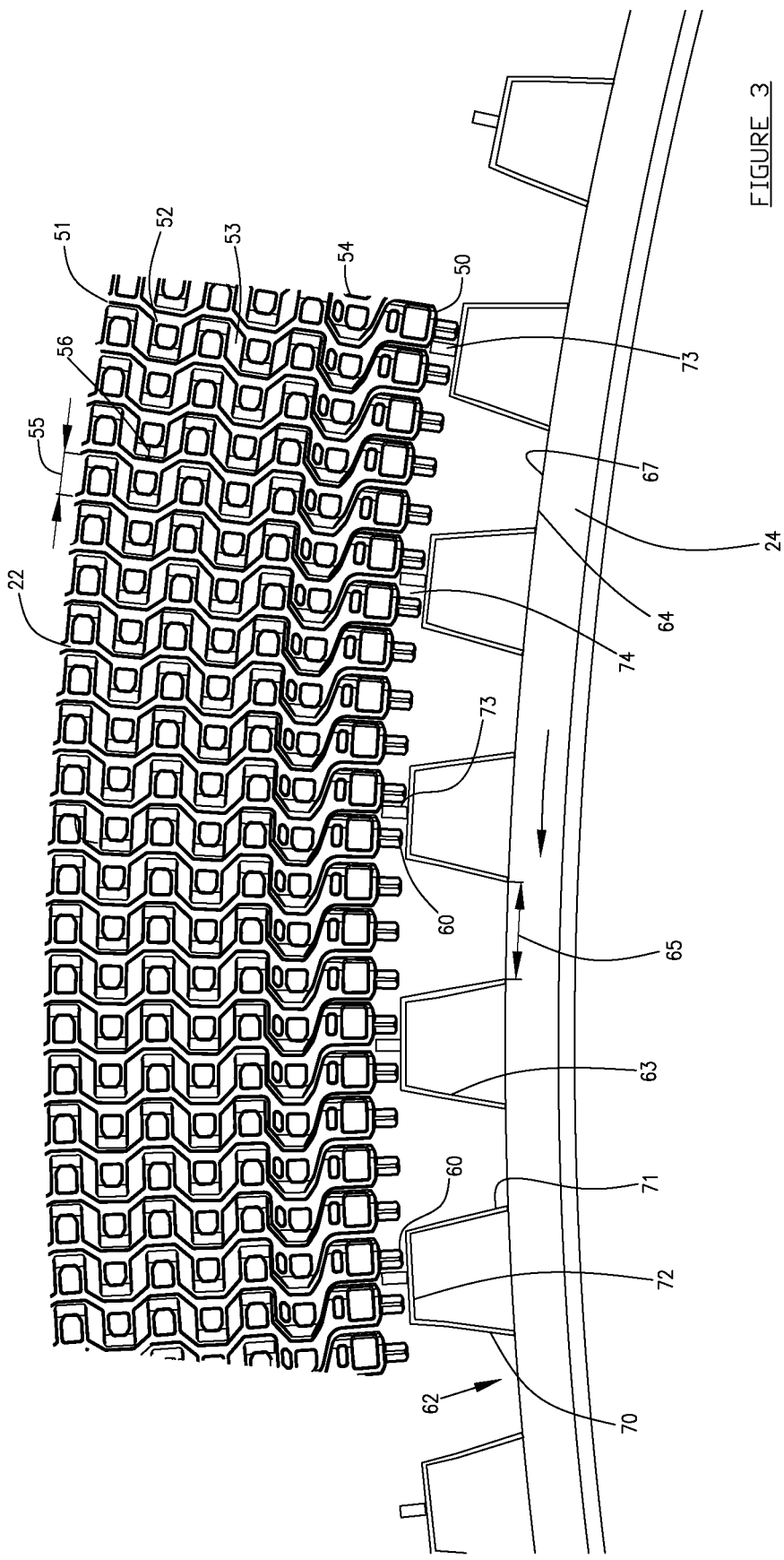
FIG. 3 is a top view of a belt in accordance with one embodiment, engaging a drum of the conveyor system of FIG. 1.

Referring now to FIGS. 1 and 3, the belt 22 includes an inner side 50, an outer side 51, and a conveying portion 52 extending between the inner side 50 and the outer side 51 configured to carry product. The belt 22 may have a width of approximately 61.7 cm (or approximately 24.3 inches). In other embodiments, the belt 22 may have a width between approximately 34.3 cm and approximately 156.7 cm (or approximately 13.5 inches and approximately 61.7 inches). In yet other embodiments, the belt 22 may have greater or lesser widths than the dimensions mentioned above.

The belt 22 may comprise a plurality of belt modules 55. Each belt module 55 may have a width of approximately 3.81 cm (or approximately 1.5 inches). In the embodiment shown, each belt module 55 includes connector elements 56 configured to connect to adjacent belt modules 55. For example, each belt module 55 may comprise alternating grooves and protrusions, wherein the grooves are adapted to receive corresponding protrusions of adjacent belt modules 55 and the protrusions are adapted to be received in corresponding grooves of adjacent belt modules 55. The connector elements 56 may be dimensioned or positioned to allow the belt 22 to collapse and expand (by the protrusions of a first belt module 55 being varyingly received in and retracted from the corresponding grooves of an adjacent belt module 55, for example) as the belt 22 travels through the conveyor system 20.

The conveying portion 52 includes an upper surface 53 and a lower surface. The upper surface 53 may be adapted for carrying the product placed on to the belt 22 at the intake or discharge regions 40 and 43. The belt 22 may include additional sidewalls (not shown) to prevent the product from falling from the conveying portion 52 during movement of the belt 22. The lower surface may be adapted to contact the tier supports 31 (and other components of the support structure 21) to facilitate movement of the belt 22 along the travel path. In this respect, the lower surface proximate the inner and outer sides 50 and 51 may include features, such as recesses or projections, which engage the wear strips of, respectively, the inner and outer rails 36. Accordingly, in the embodiment shown, the belt 22 is a structure supported belt, and each tier of the plurality of tiers 42 of the belt 22 is supported by a corresponding tier of the plurality of tier supports 31 of the support structure 21. For example, the belt 22 may be formed of Series 2900™ belt units from Intralox, L.L.C. Additionally, the belt 22 may be formed of one or more plastic materials, such as acetal plastic, nylon, polyethylene, polypropylene, polyurethane, polyketone, and polyvinylidene fluoride. The plastic material of the belt 22 may contribute to the flexibility and elasticity of the belt 22 and may allow the belt 22 to collapse and expand as the belt 22 travels through the conveyor system 20. In other embodiments, the belt 22 may be formed of one or more metal materials, such as steel, nickel-chromium alloys, and manganese for example. The metal material of the belt 22 may contribute to durability of the belt 22.

In other embodiments (not shown), the belt 22 may instead be a self-stacking belt and the conveyor system 20 may not include the support structure 21. In such embodiments, the sidewalls (not shown) extending from the inner and outer sides 50 and 51 of a lower tier of the tiers 42 may be configured to support the conveying portion 52 of a higher tier, such that each tier of the belt 22 may be stacked onto a lower tier within the conveyor stack 41. For example, the belt 22 may be formed of Series 2950™ belt units from Intralox, L.L.C.

Referring now to FIG. 3, a plurality of projections 60 extend from the inner side 50 of the belt 22. The projections 60 are operable to engage the belt 22 to the drum 24 such that rotation of the drum 24 is transferred into movement of the belt 22 along the travel path of the belt 22. In other embodiments (not shown), the inner side 50 of the belt 22 may have structures or features other than the projections 60 which engage the belt 22 to the drum 24, such as other contact surfaces associated with the inner side 50 or projections extending from the sidewalls.

Referring back to FIGS. 1 and 2, the drum 24 is a cylindrical drum or cage having the lower end 33, the upper end 34 and the periphery 62. In the embodiment shown, the drum 24 includes a plurality of parallel, generally vertical frame members 63 extending between the lower end 33 and the upper end 34. The frame members 63 are spaced apart regularly around the periphery 62, such that each frame member 63 is separated from an adjacent frame member 63 by a regular distance 65. The frame members 63 are separated from each other by a spacing wall 64 which may be recessed relative to the frame members 63. Thus, in the embodiment shown, the periphery 62 comprises a lateral wall having alternating recessed spacing walls 64 and projecting frame members 63. In other embodiments (not shown), adjacent frame members 63 may be separated by a space and the periphery 62 may comprise a cage-like structure.

Referring to FIG. 3, in the embodiment shown, each frame member 63 comprises side surfaces 70 and 71 projecting from the spacing walls 64 and a top surface 72 connecting the side surfaces 70 and 71. A drive bar 73 extends from the top surface 72. The drive bar 73 cooperates with the projections 60 extending from the inner side 50 of the belt 22 to engage the belt 22 with the drum 24 such that rotation of the drum 24 is transferred into movement of the belt 22 along the travel path of the belt 22. Further, each drive bar 73 is adapted to engage, along the drive bar's 73 vertical length, multiple projections 60 of portions of the belt 22 which form different tiers 42 of the conveyor stack 41. In some embodiments (such as those shown in FIG. 3), each frame member 63 is identical and includes a corresponding drive bar 73 mounted thereon. In other embodiments (such as those shown in FIG. 4A), not every frame member 63 includes the drive bar 73, and the drive bar 73 may be mounted to every third frame member 63. In yet other embodiments (not shown), each frame member 63 having a drive bar 73 mounted thereon may be spaced a uniform distance apart from adjacent frame members 63 having a drive bar 73 mounted thereon, such that the drive bars 73 are spaced regularly around the periphery 62. In further other embodiments (not shown), the drive bars 73 may be mounted such that the drive bars 73 are spaced irregularly around the periphery 62. In further other embodiments (such as those shown in FIG. 4B), rather than having a separate drive bar 73 mounted thereon, each of the frame members 63 themselves may engage the projections 60 or may include other features which directly frictionally engage the inner side 50 of the belt 22.

Still referring to FIG. 3, in the embodiment shown, the drive bar 73 comprises a rectangular projection from the top surface 72 of the frame members 63 and includes a planar contact surface 74. The planar contact surface 74 is adapted to contact a corresponding contact surface of the projections 60. In the embodiment shown, the drive bar 73 is joined with the top surface 72 and may be welded, adhered or otherwise semi-permanently joined thereto.

Figure 4A:
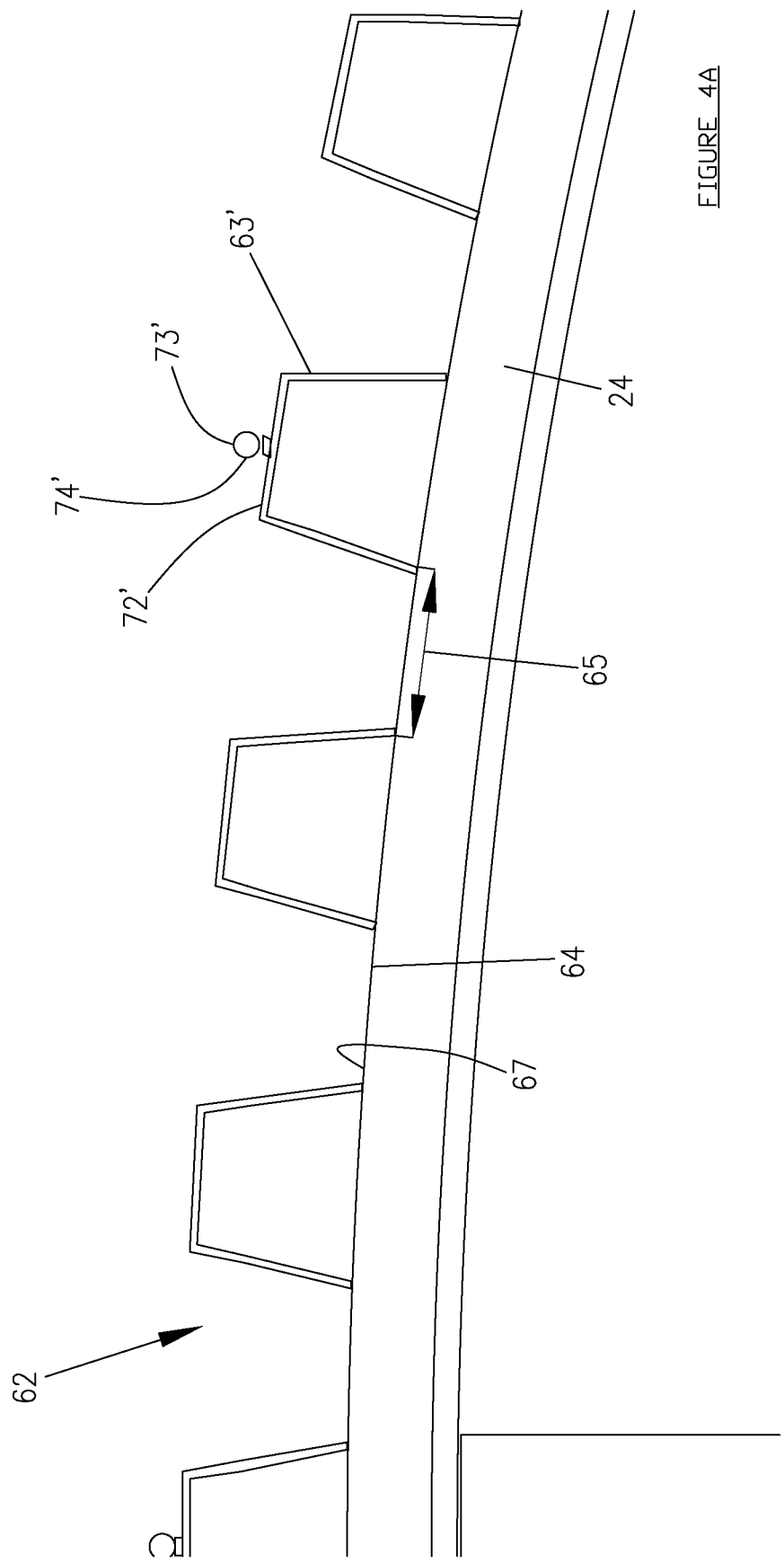
FIGS. 4A and 4B are top views of a portion of drums in accordance with other embodiments.

Referring to FIG. 4A, the drive bar 73' comprises a circular projection extending from the top surface 72' of the frame member 63'. The drive bar 73' includes a rounded contact surface 74'. The rounded contact surface 74 is adapted to contact the corresponding contact surface of the projections 60. Similar to the drive bar 73 shown in FIG. 3, the drive bar 73' is joined with the top surface 72', and may be welded, adhered or otherwise semi-permanently joined thereto. Further, as noted above, the drive bar 73 is mounted to every third frame member 63' around the periphery 62 of the drum 24, rather than being mounted to every frame member 63'. As also noted above, in other embodiments, the drive bar 73' may be mounted to every second, fourth, fifth and so forth frame members 63' that are spaced a uniform distance apart around the periphery 62 or may be mounted to frame members 63' that are spaced an irregular distance apart around the periphery 62.

Figure 4B:
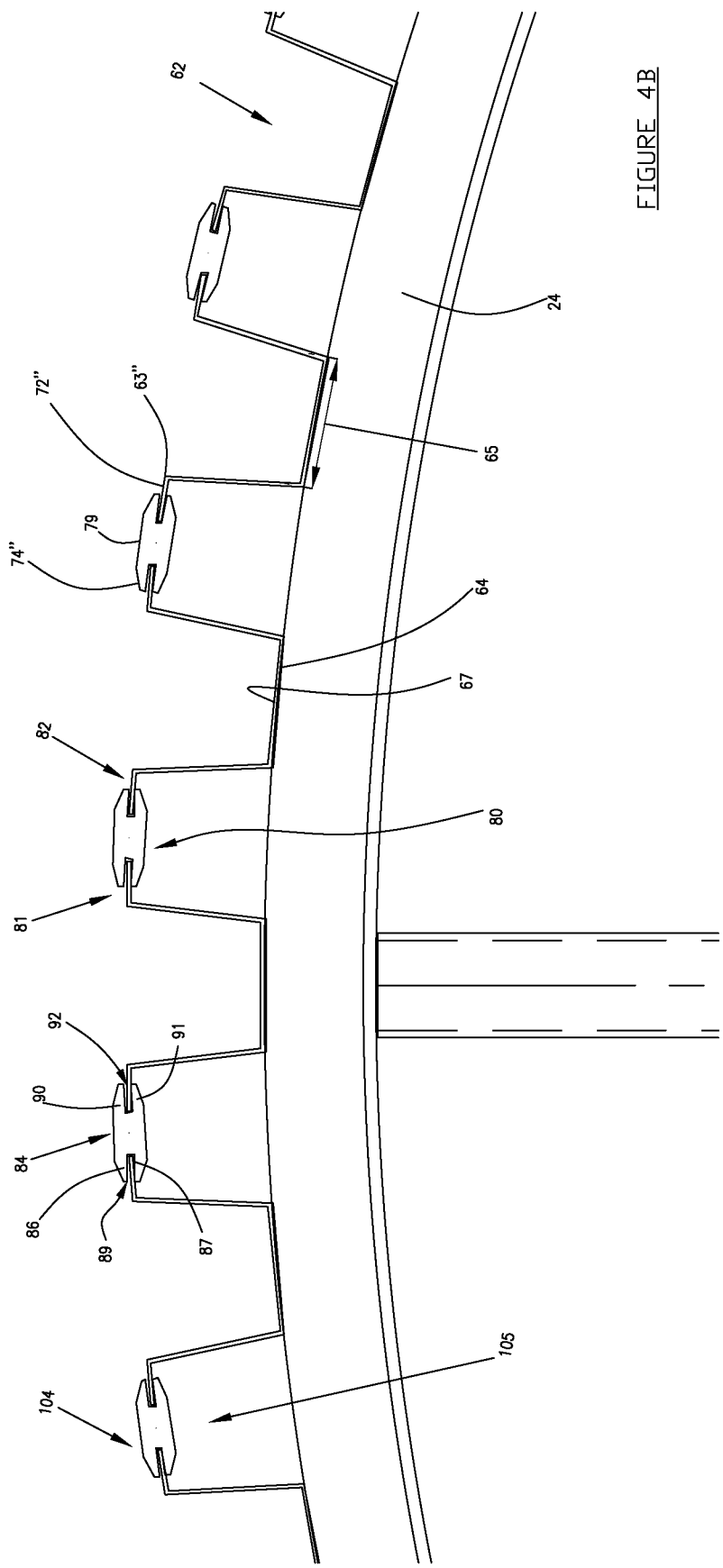

Referring to FIG. 4B, in yet other embodiments, rather than drive bars, frame members 63" may include a frame member end cap 79 which directly frictionally engages an inner side of a belt which does not include any projections (not shown) to drive the belt along the travel path of the belt. The end caps 79 may be formed of one or more plastic materials, such as acetal plastic, nylon, polyethylene, polypropylene, polyurethane, polyketone, and polyvinylidene fluoride for example. Such plastic material of the end cap 79 may be adapted to engage a belt formed of one or more metal materials, as engaging plastic materials with metal materials can reduce the wear on the metal material and reduce sparking risk. In the embodiment shown, each of the frame members 63" includes a corresponding end cap 79. However, in other embodiments, the end cap 79 may not be mounted to every frame member 63, and may be mounted to every second, third, fourth and so forth frame member 63" that are spaced a uniform distance apart around the periphery 62 or may be mounted to frame members 63" that are spaced an irregular distance apart around the periphery 62.

The end cap 79 may be removably attached to a frame member 63" rather than being joined with the frame member 63". In the embodiment shown, the top surface 72" of the frame member 63" includes a slot 80 defined by a first and second portion 81 and 82 of the top surface 72". The slot 80 may be adapted to removably receive the end cap 79 and the end cap 79 may be shaped to be removably inserted into the slot 80. In this respect, in the embodiment shown, the end cap 79 includes a body 84, first and second arms 86 and 87 extending from a first side of the body 84 which are separated by a first small slot 89 adapted to fit the first portion 81 of the top surface 72", and third and fourth arms 90 and 91 extending from a second side of the body 84 separated by second small slot 92 adapted to fit the second portion 82 of the top surface 72". When the end cap 79 is inserted into the slot 80, the body 84 bridges the gap between the first and second portions 81 and 82 of the top surface 72". Contact surfaces 74" of the end cap 79 may be adapted directly frictionally engage the inner side of the belt not including any projections. End caps 79 which may be removably inserted into frame members 63" can allow the end caps 79 to be selectively replaced depending on wear. Further, removable end caps 79 allow the end cap 79 and the frame member 63" to be made of different materials, such as wear-resistant plastic material for the end cap 79 and a structural metal for the frame members 63', and further allows the end caps 79 to be switched depending on operation. As noted above, end caps 79 formed of a plastic material can more safely frictionally engage and drive belts formed of a metal material. Further, drums utilizing removable end caps 79 may be relatively more simply and cheaply maintained, as end caps 79 which are worn from operation may be removed from the slot 80 and replaced with a new end cap 79 without need to replace the frame members 63".

Further, the end cap 79 may be substantially symmetrical about an axis, such a front portion 104 of the end cap 79 (which includes the first arm 86, a front portion of the body 84 and the third arm 90) is a mirror image of a rear portion 105 of the end cap 79 (which includes the second arm 87, a rear portion of the body 84 and the fourth arm 91). The end cap 79 may be rotated 180° about the axis such that the slot 89 fits the second portion 82 of the top surface 72" and slot 92 fits the first portion 81 of the top surface 72", and the contact surface 74" which contact the corresponding contact surface of the inner side of the belt becomes a surface of the rear portion 105 rather than a surface of the front portion 104. End caps 79 which are reversible can increase the life span of each end cap 79, as end caps 79 with a front portion 104 which has been worn can be reversed to utilize the corresponding rear portion 105.

Referring back to FIG. 2, the drum 24 is driven to rotate about a vertical axis of rotation 120 by a drum motor 121. The drum motor 121 may be operable to drive the drum 24 to rotate in a clockwise direction 122 or a counter-clockwise direction 123. Additionally, the drum motor 121 may be operable to drive the drum 24 to rotate at a plurality of different speeds. In this respect, the drum motor 121 may drive rotation of the drum 24 directly. For example, a motor shaft of the drum motor 121 (not shown) may be directly coupled to a rotational shaft of the drum 24 (not shown), such that rotation of the motor shaft translates into direct corresponding rotation of the rotational shaft. The drum motor 121 may also drive rotation of the drum 24 indirectly. For example, the motor shaft of the drum motor 121 may be offset from the rotational shaft of the drum 24, but rotation of the motor shaft may be coupled to the rotational shaft via a chain or a belt.

In certain embodiments, the drum motor 121 may be a motor including a planetary gear unit, such as the P Series™ units from SEW Eurodrive™ or the COMPOWER® gearmotors from Sumitomo Drive Technologies™. In other embodiments, the drum motor 121 may also be a motor including a worm gear unit, such as the S Series™ units from SEW Eurodrive™. In yet other embodiments, the drum motor 121 may be any motor operable to rotate the drum 24 about the axis 120 in the directions 122 and 123 and at different speeds.

The drum motor 121 may be controlled by a control system 400 (shown in FIG. 7), and may be responsive to a drum motor adjustment signal 411 (shown in FIG. 7) from the control system 400 to rotate the drum 24 about the axis 120 at different speeds and/or in the different directions 122 and 123. Due to the engagement of the drum 24 with the belt 22, the speed of rotation of the drum 24 would correspond to a speed at which the belt 22 is driven to travel the travel path of the belt 22. For example, the drum motor 121 may drive the drum 24 to rotate between a speed of approximately 3 rotations per minute, which translates to a travel speed of the belt 22 of approximately 67 metres per minute (or approximately 220 feet per minute), and a speed of approximately 0.1 rotations per minute, which translates to a travel speed of the belt 22 of approximately 3 metres per minute (approximately 10 feet per minute). Similarly, the direction of rotation of the drum 24 corresponds to a direction of travel of the belt 22. For example, when the drum motor 121 drives the drum 24 to rotate in the counter-clockwise direction 123, the belt 22 is driven to travel from the intake region 40 into the conveyor stack 41 and to the discharge region 43. In contrast, when the drum motor 121 drives the drum 24 to rotate in the clockwise direction 122, the belt 22 is driven to travel from the discharge region 43 into the conveyor stack 41, and to the intake region 40.

Still referring to FIG. 2, the drum motor 121 is also associated with a drum motor sensor 124. The drum motor sensor 124 is operable to measure an operating variable of the drum motor 121 (or of the drum 24) indicative of the speed and rotation direction that the drum 24 is being rotated by the drum motor 121. In the embodiment shown, the drum motor sensor 124 measures displacement of the motor shaft of the drum motor 121 caused by rotation of the motor shaft, and may comprise displacement probes (not shown), which measure a distance of a surface of the motor shaft relative to the displacement probes. The displacement probes may be positioned to measure motor shaft displacement along different axes of the motor shaft, such as along the x-axis, the y-axis and the z-axis for example. The vibration generated by rotation of the motor shaft results in a change in the distance between the motor shaft and the probes, and the combination of changes in distance measured by the different displacement probes over time may be used to calculate the speed and direction of rotation of the motor shaft. Additionally, the motor shaft may include a keyway or other irregular feature (not shown), which produces a large change in displacement measured by at least one of the displacement probes during every full rotation of the motor shaft. The large change may function as a keyphasor signal, which may provide a relatively simple means of measuring the speed of rotation and can also be utilized as a reference point for the displacement signals measured by the other displacement probes. In the embodiment shown, the displacement probes are eddy current sensors. However, in other embodiments, the displacement probes may instead be inductive sensors, capacitive sensors, fiber-optic sensors, Hall-effect sensors, optical sensors, and/or ultrasonic sensors. In yet other embodiments, the drum motor sensor 124 may be any other sensor which is operable to measure the operating variable of the drum motor 121 (or of the drum 24) which is indicative of the speed and rotation direction at which the drum 24 is being rotated by the drum motor 121. For example, the drum motor sensor 124 may instead sense a torque generated by the rotation of the motor shaft of the drum motor 121 or by the rotation of the rotational shaft of the drum 24, a power consumption of the drum motor 121, or a voltage output of the drum motor 121.

The drum motor sensor 124 is further operable to produce a drum motor signal 410 (shown in FIG. 7) representing the operating variable of the drum motor 121 (or of the drum 24) and to transmit the drum motor signal 410 to the control system 400. The drum motor signal 410 may be used by the control system 400 (alone or in combination with other signals described below) to generate an appropriate drum motor adjustment signal 411 to control the drum motor 121 as a feedback loop. Described in greater detail below, the drum motor signal 410 may also be used by the control system 400 to control other components of the conveyor system 20, including an intake motor 141 and a discharge motor 151.

Referring back to FIGS. 1 and 2, the conveyor system 20 further includes a plurality of rollers outside of the conveyor stack 41, and the belt 22 may be fed around the different rollers in the intake region 40, the discharge region 43 and the linking region 44. The rollers may be motorized or idle rollers. The motorized rollers may cooperate with the drum 24 to drive the belt 22 along the travel path of the belt 22 at a particular belt speed, at a particular belt tension, and in a particular rotation direction. The idle rollers may help maintain the belt 22 at the particular belt tension, and may help prevent skipping, slipping and entanglement of the belt 22 during operation of the conveyor system 20.

In the embodiment shown, the conveyor system 20 includes at least a motorized intake roller 130 located within the intake region 40 and a motorized discharge roller 131 located within the discharge region 43. In other embodiments, the conveyor system 20 may include more than one motorized intake roller 130 and/or more than one motorized discharge roller 131. Best seen in FIG. 2, the intake roller 130 is driven to rotate about an axis of rotation 140 by the intake motor 141, and may be driven by the intake motor 141 to rotate about the axis 140 in a clockwise direction 142 and a counter-clockwise direction 143 and at a plurality of different speeds. Similarly, the discharge roller 131 is driven to rotate about an axis of rotation 150 by a discharge motor 151, and may be driven by the discharge motor 151 to rotate about the axis 150 in a clockwise direction 152 and in a counter-clockwise direction 153 and at a plurality of different speeds. Similar to the drum motor 121, both the intake and discharge motors 141 and 151 may drive rotation of, respectively, the intake roller 130 and the discharge roller 131 directly or indirectly. For example, a motor shaft of the intake motor 141 may be directly coupled to a roller shaft of the intake roller 130 and a motor shaft of the discharge motor 151 may be directly coupled to a roller shaft of the discharge roller 131 such that the rotation of the motor shafts translate into direct and corresponding rotation of the roller shafts. In other embodiments, the motor shafts of the intake motor 141 and the discharge motor 151 may be indirectly coupled to the roller shafts of the intake roller 130 and the discharge roller 131.

In certain embodiments, the intake and discharge motors 141 and 151 may be electric motors including a helical bevel gearbox, such as the K Series™ units from SEW Eurodrive™ In other embodiments, the intake motor 141 may be any motor operable to rotate the intake roller 130 about the axis 140 in the clockwise and counter-clockwise directions 142 and 143 and at the different speeds, and the discharge motor 151 may be any motor operable to rotate the discharge roller 131 about the axis 150 in the clockwise and counter-clockwise directions 152 and 153, and at the different speeds.

Figure 7:
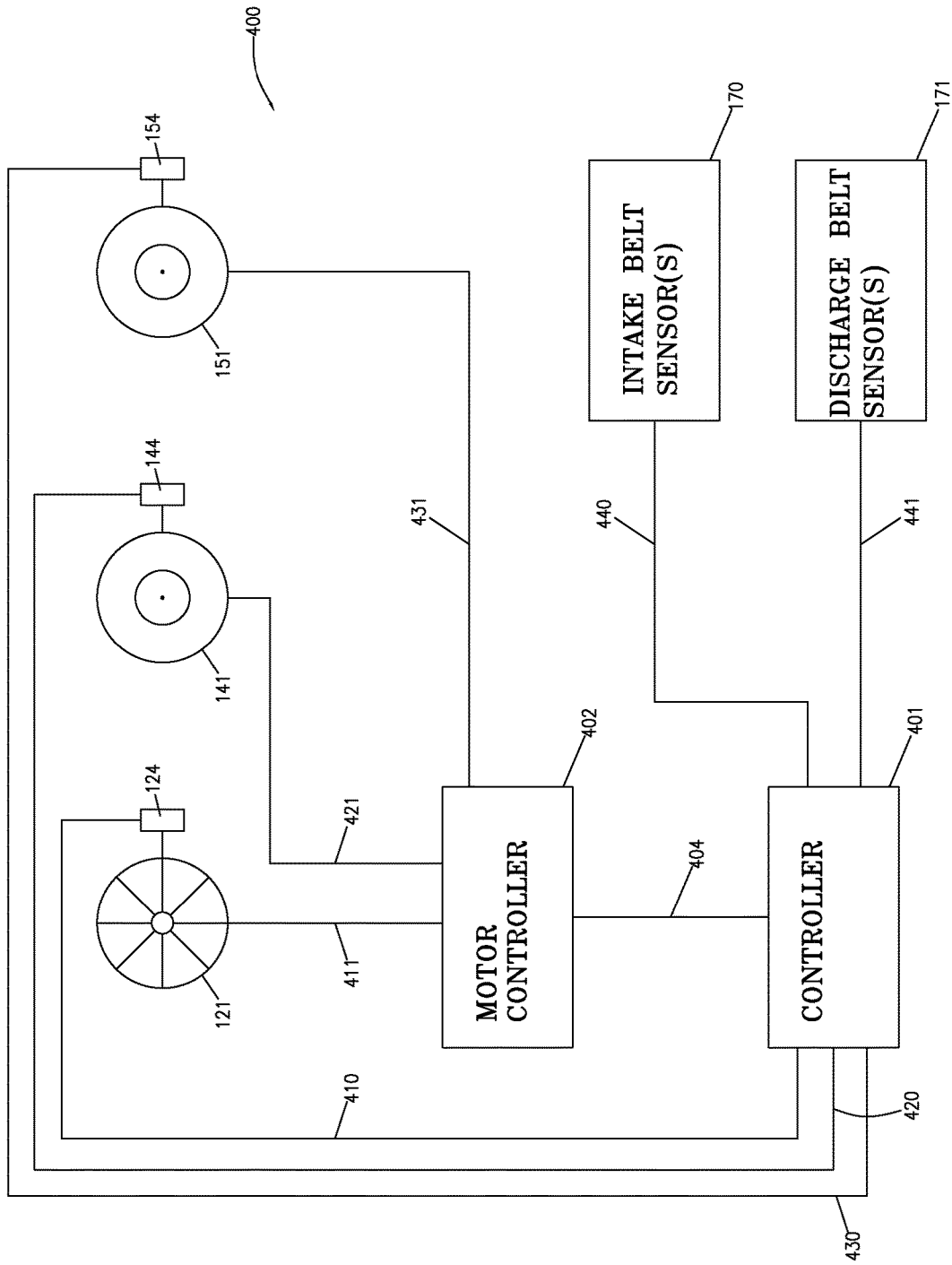
FIG. 7 is a block diagram of a control system for providing feedback control of the conveyor system shown in FIG. 1.

Similar to the drum motor 121, the intake and discharge motors 141 and 151 may both also be controlled by the control system 400 (shown in FIG. 7). The intake motor 141 may be responsive to an intake motor adjustment signal 421 (shown in FIG. 7) from the control system 400 to rotate the intake roller 130 about the axis 140 at different speeds and/or in one of the different directions 142 and 143. Similarly, the discharge motor 151 may be responsive to a discharge motor adjustment signal 431 (shown in FIG. 7) to rotate the discharge roller 131 about the axis 150 at different speeds and/or in one of the different directions 152 and 153.

The intake and discharge motors 141 and 151 may be controlled by the control system 400 independently of each other, such that one of the intake and discharge rollers 130 and 131 may be adjusted to a particular rotation speed independently of a rotation speed of the other, or may be rotated in one of the clockwise directions 142 and 152 and the counter-clockwise directions 143 and 153 independently of the rotation direction of the other. The intake and discharge motors 141 and 151 may also be controlled by the control system 400 independently of the drum motor 121, such that adjustment of the speed or rotation direction of one of the intake roller 130, the discharge roller 131 and the drum 24 may be performed independently of any speed adjustment or direction adjustment of the others. However, in certain embodiments, the intake and discharge motors 141 and 151 may be controlled by the control system 400 synchronously, such that adjustment of one of the intake and discharge rollers 130 and 131 to a particular speed or in a particular rotation direction results in the automatic adjustment of the other roller to a same or corresponding speed and that particular rotation direction. In further embodiments, the intake motor 141, the discharge motor 151 and the drum motor 121 may be controlled by the control system 400 synchronously, such that adjustment of one of the intake roller 130, the discharge roller 131 and the drum 24 to a particular speed or in a particular rotation direction results in the automatic adjustment of at least one of the other ones of the intake roller 130, the discharge roller 131 and the drum 24 to a same or corresponding speed and that particular rotation direction.

Due to engagement of the belt 22 with the intake roller 130 in the intake region 40 and the discharge roller 131 in the discharge region 43, the speed of rotation of the intake and discharge rollers 130 and 131 corresponds to a travel speed of the belt 22. For example, the intake and discharge motors 141 and 151 may drive, respectively, the intake and discharge rollers 130 and 131 to rotate between a speed of approximately 130 rotations per minute, which translates to a travel speed of the belt 22 of approximately 67 metres per minute (or approximately 220 feet per minute) and a speed of approximately 6.6 rotations per minute, which translates to a travel speed of the belt 22 of approximately 3 metres per minute (or approximately 10 feet per minute). The direction of rotation of the intake and discharge rollers 130 and 131 similarly correspond to a direction of travel of the belt 22.

For example, when the intake motor 141 drives the intake roller 130 to rotate in the clockwise direction 142, the belt 22 is driven towards the drum 24 as the belt 22 travels from the intake region 40 into the conveyor stack 41; and when the intake roller 130 is driven to rotate in the counter-clockwise direction 143, the intake roller 130 pulls the belt 22 away from the drum 24 as the belt 22 travels in a reverse direction from the conveyor stack 41 to the intake region 40. Similarly, when the discharge motor 151 drives the discharge roller 131 in the clockwise direction 152, the discharge roller 131 pulls the belt 22 away from the drum 24 as the belt 22 travels from the conveyor stack 41 to the discharge region 43; and when the discharge roller 131 is driven to rotate in the counter-clockwise direction 153, the discharge roller 131 drives the belt 22 towards the drum 24 as the belt 22 travels in a reverse direction from the discharge region 43 into the conveyor stack 41.

Still referring to FIG. 2, similar to the drum motor 121, the intake motor 141 is associated with an intake motor sensor 144 and the discharge motor 151 is associated with a discharge motor sensor 154.

The intake motor sensor 144 is operable to measure an operating variable of the intake motor 141 (or of the intake roller 130) indicative of the speed and rotation direction at which the intake roller 130 is being driven by the intake motor 141. The intake motor sensor 144 may be similar to the drum motor sensor 124 and may comprise at least one probe (not shown) operable to measure displacement of the motor shaft of the intake motor 141 during rotation of the motor shaft due to operation of the intake motor 141. Similar to the drum motor sensor 124, the at least one probe of the intake motor sensor 144 may comprise a plurality of probes position to measure displacement along different axes of the motor shaft of the intake motor 141. The at least one probe may be an ultrasonic sensor, such as UM18-217126112 ultrasonic sensor manufactured by Sick AG™. In other embodiments, the at least one probe may instead be an inductive sensor, an eddy current sensor, a capacitive sensor, a fiber-optic sensor, an optical sensor or a Hall-effect sensor. In yet other embodiments, the intake motor sensor 144 be any other sensor which is operable to measure the operating variable of the intake motor 141 (or of the intake roller 130) which is indicative of the speed and rotation direction at which the intake roller 130 is being driven by the intake motor 141. For example, the intake motor sensor 144 may instead sense a torque generated by the rotation of the motor shaft of the intake motor 141 or rotation of a roller shaft of the intake roller 130, a power consumption of the intake motor 141, or a voltage output of the intake motor 141.

The intake motor sensor 144 is further operable to produce an intake motor signal 420 (shown in FIG. 7) representing the operating variable of the intake motor 141 (or of the intake roller 130) and to transmit the intake motor signal 420 to the control system 400. The intake motor signal 420 may then be used by the control system 400 (alone or in combination with other signals described above and below) to generate an appropriate intake motor adjustment signal 421 to control the intake motor 141 as a feedback loop. Described in greater detail below, the intake motor signal 420 may also be used by the control system 400 to control operation of other components of the conveyor system 20, including the drum motor 121 and the discharge motor 151.

Still referring to FIG. 2, similar to the intake motor sensor 144, the discharge motor sensor 154 is operable to measure an operating variable of the discharge motor 151 (or of the discharge roller 131) indicative of the speed and rotation direction at which discharge roller 131 is being driven by the discharge motor 151. The discharge motor sensor 154 may be a torque sensor operable to measure the torque generated by rotation of at least one component of the discharge motor 151 and/or the discharge roller 131, including the rotation of the motor shaft of the discharge motor 151, a rotational shaft of a gearbox of the discharge motor 151, or the roller shaft of the discharge roller 131. For example, the discharge motor sensor 154 may comprise a torque arm and a load cell. One end of the torque arm is coupled to the rotating shaft (the motor shaft, the rotational shaft or the roller shaft noted above for example) while the other end of the torque arm is in contact with the load cell. When the rotational shaft rotates during operation of the discharge motor 151, the torque arm applies a load to the load cell, wherein the load applied by the torque arm is proportional to the output of the discharge motor 151. The discharge motor sensor 154 may be an internal component of the discharge motor 151 or may be a separate component to the discharge motor 151. In other embodiments, the discharge motor sensor 154 may be any other sensor which is operable to measure a torque of the discharge motor 151 or of the discharge roller 131, and may be a strain gauge, a rotary torque transformer or a torque cell for example. In yet other embodiments, the discharge motor sensor 154 may be any other sensor which is operable to measure an operating variable of the discharge motor 151 (or of the discharge roller 131) indicative of the speed and rotation direction at which the discharge roller 131 is being driven by the discharge motor 151. For example, the discharge motor sensor 154 may be a displacement sensor configured to measure displacement of the motor shaft, similar to the probes described above in association with the drum motor sensor 124 and the intake motor sensor 144.

The discharge motor sensor 154 is further operable to produce a discharge motor signal 430 (shown in FIG. 7) representing the operating variable of the discharge motor 151 (or of the discharge roller 131) and to transmit the discharge motor signal 430 to the control system 400. The discharge motor signal 430 may be used by the control system 400 (alone or in combination with other signals described above and below) to generate the discharge motor adjustment signal 431 to control the discharge motor 151 as a feedback loop. Described in greater detail below, the discharge motor signal 430 may also be used by the control system 400 to control other components, including the drum motor 121 and the intake motor 141.

The belt 22 may be specified for operation at tensions within a pre-defined range. For example, as described above, the belt 22 may comprise Series 2900™ belt units from Intralox, L.L.C formed of one or more plastic materials, and may be specified for an operational tension in a range between approximately 50 lbf and approximately 200 lbf, and a maximal tension of approximately 420 lbf. However, tension in the belt 22 throughout the conveyor system 20 may vary due to a variety of different factors, including the speed and rotational direction the drum 24 is driven by the drum motor 121, the speed and rotational direction the intake roller 130 is driven by the intake motor 141, the speed and rotational direction the discharge roller 131 is driven by the discharge motor 151, the number of tiers 42, whether the belt 22 is loaded with product and the location of the load within the conveyor system 20, friction between the belt 22 and the tier supports 31, and the existence of any product buildup within the conveyor system 20 (whether on the belt 22, the drum 24 or the support structure 21). Maintaining tension in the belt 22 throughout the conveyor system 20 can be important to: prevent belt surging, whereby the belt 22 repeatedly moves and stops in a stick-slip motion; reduce wear to the belt 22, intake and discharge rollers 130 and 131, and other components of the conveyor system 20; prevent belt skipping, whereby the projections 60 do not fully engage with the drive bars 73 when the belt 22 transitions from the intake or discharge regions 40 and 43 to the conveyor stack 41; and prevent sagging, slipping and disengagement of the belt 22.

As noted above, the speed of rotation of each of the drum 24, the intake roller 130 and the discharge roller 131 relative to each other can affect the tension in the belt 22. For example, if the intake roller 130 feeds the belt 22 into the drum 24 faster than the drum 24 can receive the belt 22, the tension in the belt 22 will decrease in the intake region 40 and the belt 22 may become slack and lead to belt surging or sagging or disengagement in the intake region 40. Similarly, if the discharge roller 131 pulls the belt 22 away from the drum 24 slower than the drum 24 is rotating to discharge it, the tension in the belt 22 will decrease in the discharge region 43. In contrast, if the intake roller 130 feeds the belt 22 into the drum 24 slower than the drum 24 is rotating to receive it, the tension in the belt 22 will increase in the intake region 40 and the belt 22 may become overstressed and lead to damage or breakage or belt skipping when the belt 22 contacts the drum 24. Similarly, if the discharge roller 131 pulls the belt 22 away from the drum 24 faster than the drum 24 can discharge it, the tension in the belt 22 will increase in the discharge region 43. Additionally, if the intake roller 130 and the discharge roller 131 are driven at different speeds, the tension in the belt 22 in the intake region 40, the conveyor stack 41, the discharge region 43 versus the linking region 44 may also be higher or lower than desired. For example, if the intake roller 130 is driven faster than the discharge roller 131, then the tension in the belt 22 may decrease in the intake region 40, the conveyor stack 41, and the discharge region 43, but may increase in the linking region 44. In contrast, if the intake roller 130 was driven slower than the discharge roller 131, than the tension in the belt 22 may increase in the intake region 40, the conveyor stack 41 and the discharge region 43, but may decrease in the linking region 44. Thus, to maintain the tension in the belt 22 throughout the conveyor system 20 within the pre-defined range, the speed and direction of each of the drum 24, the intake roller 130 and the discharge roller 131 may be coordinated and adjusted based on speeds of other components using the control system 400 (shown in FIG. 7).

Additionally, in certain operations, it may be necessary to drive the drum 24, the intake roller 130, and the discharge roller 131 at different speeds or in different directions relative to each other. For example, it may be desirable to drive the drum 24 at a speed which is slightly lower than the speed at which the intake roller 130 feeds the belt 22 into the drum 24, to decrease tension in the belt 22 in a transition zone from the intake region 40 to the first tier 45 of the conveyor stack 41. The decreased tension may reduce damage to the belt 22 as the belt 22 transitions from the substantially linear configuration in the intake region 40 into the curved configuration of the conveyor stack 41. A slower rotating drum 24 may also promote more secure engagement of the projections 60 with the drive bars 73 when the belt 22 enters the conveyor stack 41 at the first tier 45, as a slower rotating drum 24 may increase friction and contact between the projections 60 and the drive bars 73. Additionally, the drum 24 may also be driven at a slightly higher speed than the discharge roller 131, to reduce tension in the belt 22 in the discharge region 43 as the belt 22 transitions from the curved configuration in the conveyor stack 41 back into the substantially linear configuration in the discharge region 43.

However, in some operations it may be desirable to drive the drum 24 at a slightly higher speed than the intake roller 130 to maintain or increase tension in the belt 22 in the intake region 40, or to drive the drum 24 at a slightly lower speed than the discharge roller 131 to maintain or increase tension in the belt 22 in the discharge region 43. Increasing tension in the belt 22 may reduce belt surging, as the increased tension can overcome some of the frictional forces between the belt 22 and the support structure 21 which cause belt surging.

In other embodiments, a load generated by products being placed on conveying portion 52 and subsequent removal of the load when the products are removed from the conveying portion 52, certain products freezing or melting onto the conveying portion 52, debris accumulating on a portion of the belt 22 or support structure 21 and buildup on the belt 22 or the support structure 21 (such as on the inner and outer rails 36 of the tier support 31 for example) may otherwise affect the tension in a specific portion of the belt 22 as it travels during operation of the conveyor system 20. In such operations, one or more of the drum 24, the intake roller 130 or the discharge roller 131 may need be driven at a different speed or a different direction for a period of time to maintain the tension in the belt 22 within the pre-defined range, to prevent surging of the belt 22, to prevent skipping of the belt 22, or to prevent sagging, slipping and disengagement of the belt 22.

Referring to FIG. 2, the conveyor system 20 further includes at least one intake belt sensor 170 proximate the intake region 40 to sense a tension in a portion of the belt 22 in the first tier 45 and at least one discharge belt sensor 171 proximate the discharge region 43 to sense a tension in a portion of the belt 22 in the final tier 46.

In the embodiment shown in FIG. 2, the intake belt sensor 170 is mounted to the periphery 62 of the drum 24 near the lower end 33 of the drum 24 which would engage the portion of the belt 22 that forms the first tier 45 as the belt 22 moves from the intake region 40 into the conveyor stack 41. This positioning may allow the intake belt sensor 170 to contact and to measure tension in a portion of the belt 22 in the first tier 45 and proximate the intake region 40. Further, as the intake belt sensor 170 is associated with the drum 24, the intake belt sensor 170 will rotate with the drum 24 to substantially continually contact and move with a particular portion of the belt 22 in the first tier 45 as that particular portion of the belt 22 rotates with the drum 24. However, as that particular portion of the belt 22 exits the first tier 45 to enter a second tier of the conveyor stack 41, the intake belt sensor 170 remains at the periphery 62 near the lower end 33 of the drum 24 and will contact and move with a subsequent portion of the belt 22 which now enters the first tier 45.

More specifically, in the embodiment shown in FIG. 2 (and described in greater detail below in association with FIGS. 5A, 5B and 6), the intake belt sensor 170 is mounted to the spacing wall 64 extending between two frame members 63. In other embodiments where the drum 24 does not include the spacing walls 64, such as in embodiments where adjacent frame members 63 are separated with the spaces, the intake belt sensor 170 may be mounted to a tab or other flap (not shown) extending from a first side or a second side of a frame member 63.

Figure 5A:
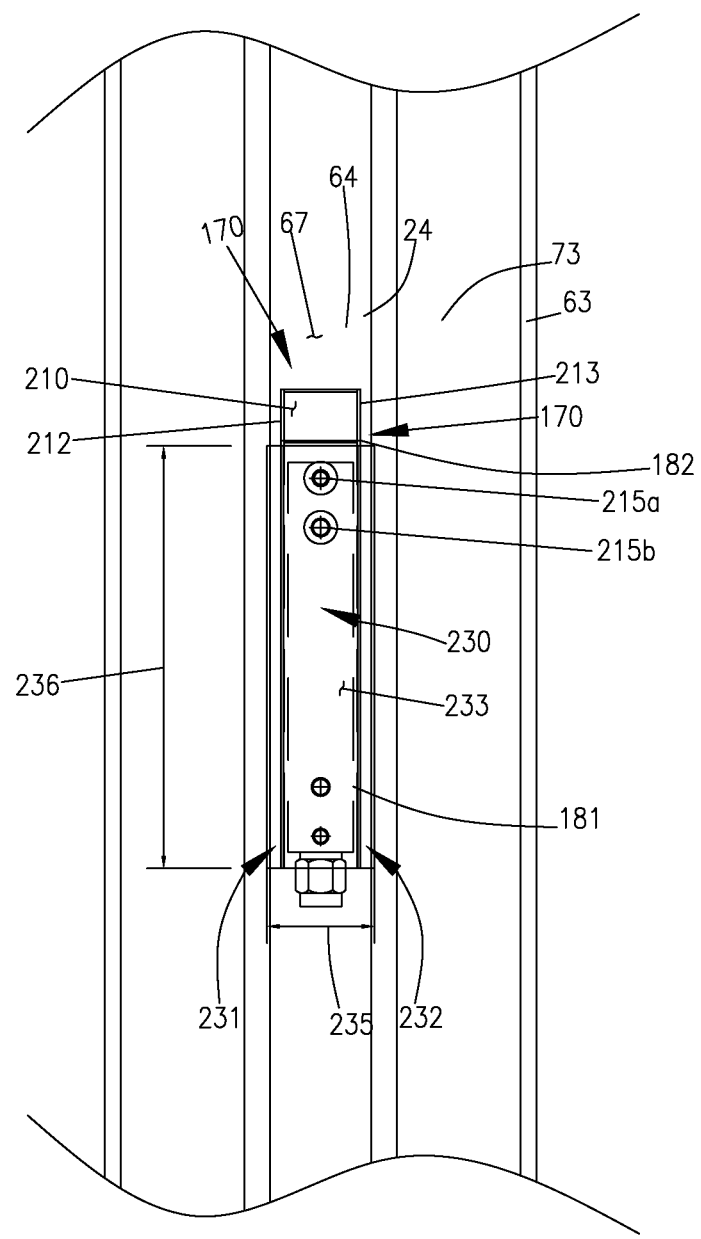
FIGS. 5A and 5B are a front elevation view and a side elevation view of a belt sensor in accordance with one embodiment, mounted to a drum of the conveyor system shown in FIG. 1.
Figure 5B:
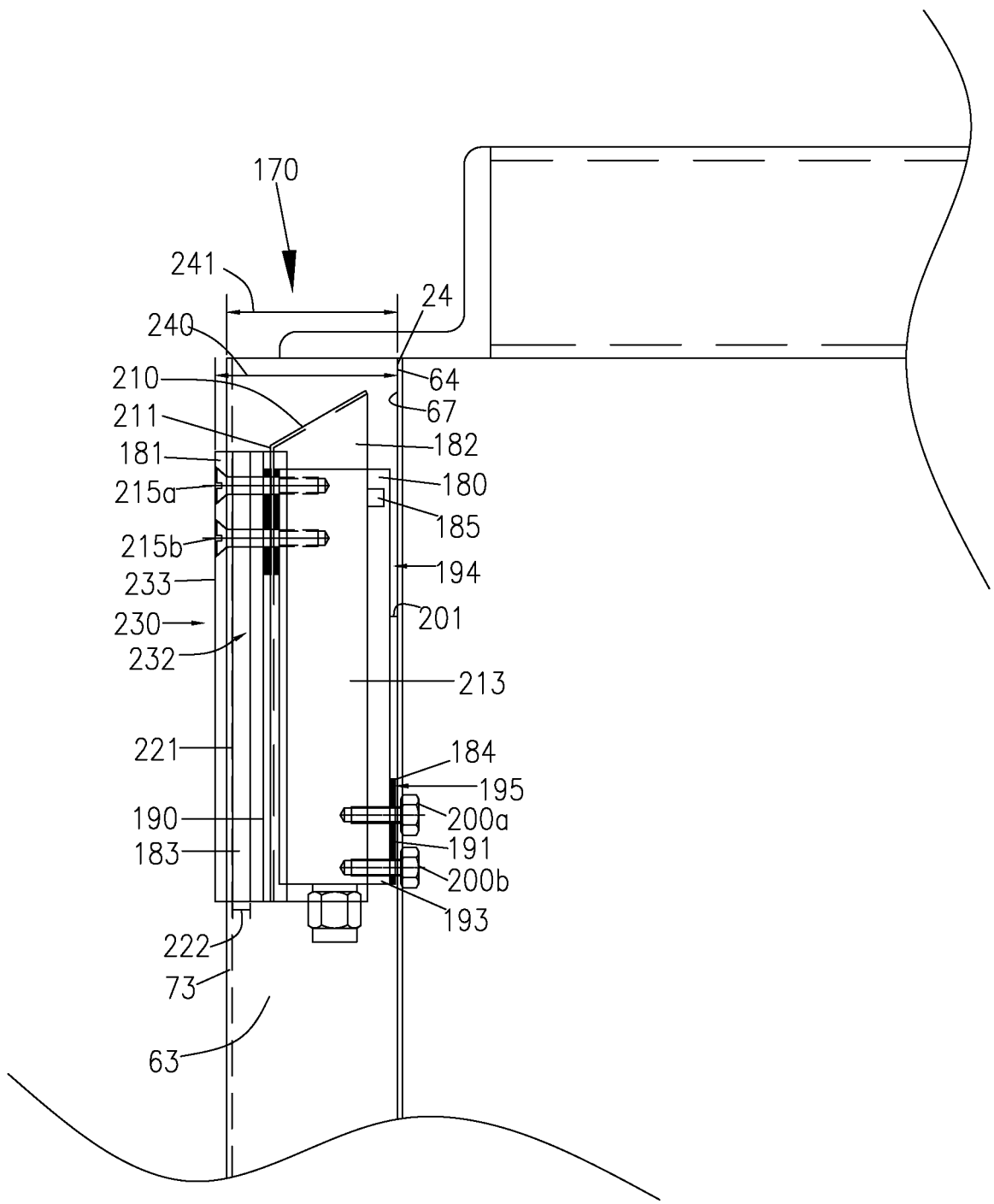
Figure 6:
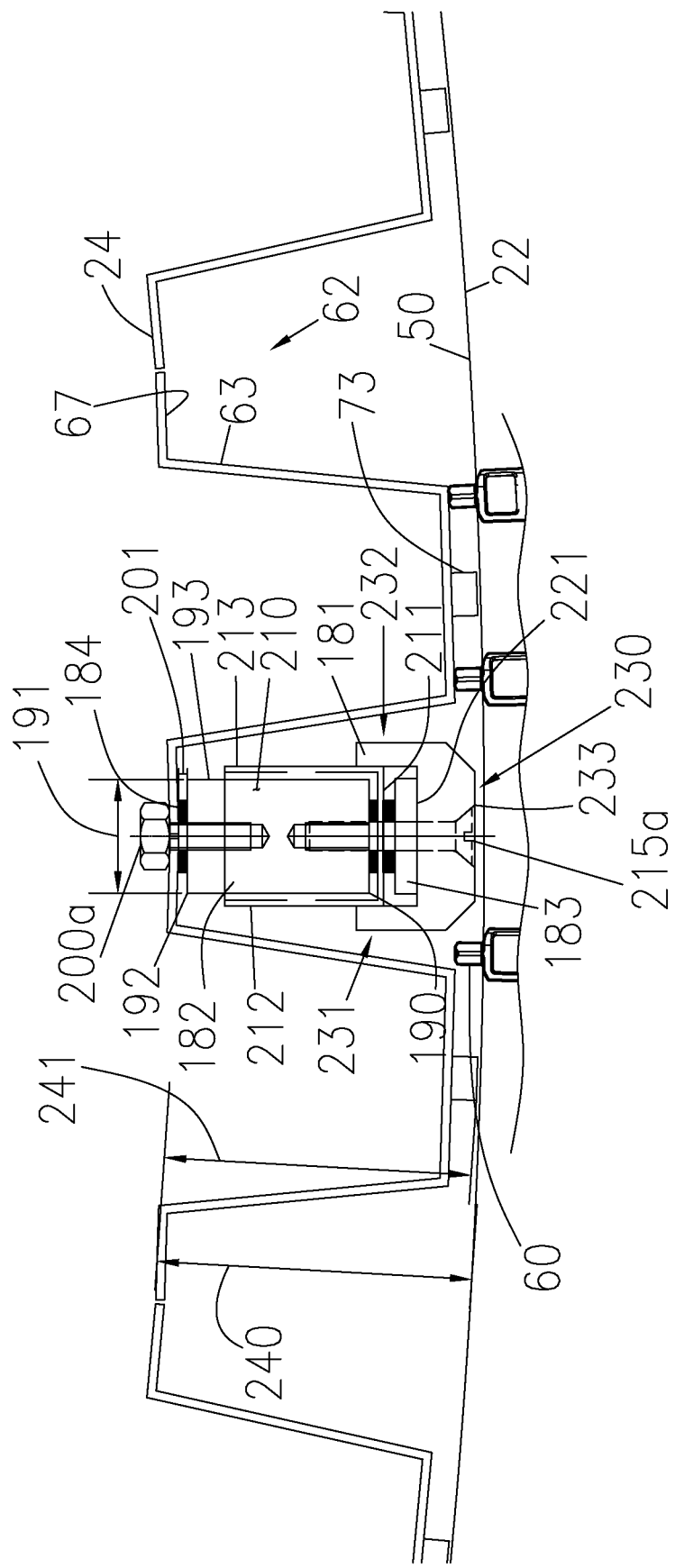
FIG. 6 is a top plan view of the belt sensor of FIGS. 5A and 5B, interacting with a portion of a belt of the conveyor system shown in FIG. 1.

An embodiment of the intake belt sensor 170 is shown in FIGS. 5A, 5B, and 6. FIGS. 5A and 5B illustrate a front elevation view and a side elevation view of the intake belt sensor 170 in accordance with one embodiment. FIG. 6 illustrates a top plan view of the intake belt sensor 170 and the portion of the belt 22 which forms the first tier 45 of the conveyor stack 41. In the embodiment shown, the intake belt sensor 170 includes a load cell 180, a contact member 181, a load cell cover 182, a front bar 183, a back spacer 184, and a wireless transmitter 185. In other embodiments, the intake belt sensor 170 may include more or fewer components, and may only include the load cell 180, the contact member 181 and the wireless transmitter 185 for example. In yet other embodiments, intake belt sensor 170 may comprise any other sensor operable to measure tension in a portion of the belt 22 which forms the first tier 45. For example, the intake belt sensor 170 may be a load cell positioned beneath the belt 22 in an elevated platform extending from the first or the second side of a frame member 63 or extending from the inner or outer rails 36 of the tier supports 31, and may be operable to sense tension in the belt 22 by the belt's 22 downward force against the load cell.

In the embodiment shown, the load cell 180 comprises a single-point load cell and may be a SLP845 load cell from Mettler Toldeo™ for example. The load cell 180 thus has a substantially rectangular shape comprising an upper portion 194 and a lower portion 195 (best seen in FIG. 5B). The load cell 180 has a rear face 191, a front face 190, a first side face 192 and second side face 193. When a load is applied to a portion of the front face 190 located within the upper portion 194, the upper portion 194 deflects relative to the lower portion 195 proportional to the load applied, and the deflection may cause the load cell 180 to generate a belt signal 440 (shown in FIG. 7) proportional to the level of deflection and thus proportional to the load applied.

To enable deflection of the upper portion 194 relative to the lower portion 195, the lower portion 195 may be mounted to the spacing wall 64 of the drum 24 with the back spacer 184 (best seen in FIG. 5B) positioned between the rear face 191 proximate the lower portion 195 and the front surface 67 of the spacing wall 64. Both the back spacer 184 and lower portion 195 of the load cell 180 may then be fastened to the spacing wall 64 with fasteners 200a and 200b. This mounting of the load cell 180 simultaneously fixes the lower portion 195 to a fixed point (the spacing wall 64) while a width of the back spacer 184 provides a deflection distance 201 to enable deflection of the upper portion 194 relative to the lower portion 195 when a load is applied to the upper portion 194 to allow the load cell 180 to generate the belt signal 440 (shown in FIG. 7).

The load cell cover 182 may function to protect the front face 190 of the load cell 180 from debris, detritus, dirt or other miscellaneous particles which may affect measurements from the load cell 180. In the embodiment shown, the load cell cover 182 includes an inclined top face 210, a vertical front face 211, a first side face 212 and a second side face 213, and the faces 210, 211, 212 and 213 form a rear recess configured to receive the load cell 180. In the embodiment shown, the load cell cover 182 is made of stainless steel. However, in other embodiments, the load cell cover 182 may be made of other metals or polymers and plastic.

The front face 211 of the load cell cover 182 may be secured to the front face 190 of the load cell 180 with fasteners 215a and 215b proximate the upper portion 194 of the load cell 180 (best seen in FIG. 5B). In other embodiments, the load cell cover 182 may be secured to the front face 190 in a different manner, such as via a friction fit or an adhesive for example. When the load cell cover 182 is secured to the load cell 180, the front face 211 substantially covers the front face 190 of the load cell 180, the top face 210 may extend to partially cover a top face of the load cell 180, the first side face 212 may extend to partially cover the first side face 192 of the load cell 180, and the second side face 213 may extend to partially cover the second side face 193 of the load cell 180. Thus, the load cell cover 182 covers various faces of the load cell 180 generally protect the load cell 180 from debris. The dimensions of the load cell cover 182 may vary depending on dimensions of the load cell 180, as the load cell cover 182 is generally dimensioned to cover the load cell 180. The top face 210 may be inclined at an angle relative to the front face 211, and the incline of the top face 210 may be such that debris falling onto the top face 210 will slide off the load cell cover 182 by gravity, which may allow the load cell cover 182 to protect the load cell 180 from debris falling from above without buildup on the top face 210.

The front bar 183 may function to support to the load cell 180, and to uniformly deflect in response to load applied by the belt 22 to apply load to the front face 190 of the load cell 180 in a substantially uniform manner regardless of where the belt 22 contacts the intake belt sensor 170 along a length 236 of the contact member 181 (described in greater detail below). In the embodiment shown, the front bar 183 includes a front face 221 and a thickness 222 of approximately 6.35 mm (or approximately 0.25 inches), a width of approximately 25.4 mm (or approximately 1 inch), and a length of approximately 152.4 mm (or approximately 6 inches). In other embodiments, the thickness 222 may range between approximately 6.35 mm and approximately 25.4 mm (or between approximately 0.25 inches and approximately 1 inch), the width of the front bar 183 may be dimensioned to be similar to or slightly narrower than the width of the front face 211 of the load cell cover 182, and the length of the front bar 183 may range between approximately 101.6 mm and approximately 254 mm (or between approximately 4 inches and approximately 10 inches) or may be dimensioned to be similar to or slightly shorter than the length of the front face 211 of the load cell cover 182. Accordingly, the length and the width of the front bar 183 may vary depending on the length and the width of the front face 211 of the load cell cover 182 (which in turn depends on the length and the width of the front face 190 of the load cell 180 as noted above). In the embodiment shown, the front bar 183 is made of stainless steel. In other embodiments, the front bar 183 may be made of other metals, or of other polymers and plastics such as ultra-high molecular weight (UEMW) plastic or polymers, or any other materials which enables uniform deflection as described above.

The front bar 183 may be secured to the load cell cover 182 with the same fasteners 215a and 215b proximate the upper portion 194 of the load cell 180 used to secure the load cell cover 182 to the load cell 180 (best seen in FIG. 5B), such that the front bar 183 is secured to the load cell cover 182 and the load cell 180. When the front bar 183 is fastened to the load cell cover 182, the front bar 183 is positioned and dimensioned to cover at least a portion of the front face 221 of the load cell cover 182. When a load is applied to the front bar 183 proximate the upper portion 194, one or more of the thickness 222, the length, the width of the front bar 183 and the material of the front bar 183 can allow the front bar 183 to deflect in a uniform manner in response to the load. Deflection of the front bar 183 is then transferred to deflection of the load cell cover 182 and ultimately deflection of the upper portion 194 of the load cell 180.

The contact member 181 functions as a point of contact between the inner side 50 of the belt 22 and the intake belt sensor 170, and transfers a load exerted by the inner side 50 of the belt 22 to the load cell 180 (best seen in FIGS. 5B and 6). In the embodiment shown, the contact member 181 includes a central portion 230 and first and second side portions 231 and 232 extending from sides of the central portion 230. The central portion 230 includes a contact surface 233 which directly contacts the inner side 50 of the belt 22. The central and side portions 230, 231 and 232 form a rear recess configured to receive the front bar 183, the load cell cover 182 and the load cell 180. In the embodiment shown, the contact member 181 may be made of UHMW plastic, which may provide the contact member 181 with high abrasion and wear resistance to withstand repeated loads applied by the belt 22, low friction to allow the contact member 181 to release the belt 22 when the belt 22 exits the first tier 45 to enter the second tier, and low chemical reactivity. However, in other embodiments (not shown), the contact member 181 may be made of other materials, such as metal materials or other polymer materials. In yet other embodiments (not shown), the central portion 230 may be made of different materials than the first and second side portions 231 and 232. For example, the central portion 230 may be formed of a highly durable material, whereas the first and second side portions 231 and 232 may be formed of less durable and less expensive material.

The central portion 230 of the contact member 181 may be secured to the front face 221 of the front bar 183 with the same fasteners 215a and 215b proximate the upper portion 194 of the load cell 180 used to secure the front bar 183 to the load cell cover 182 and the load cell 180 (best seen in FIG. 5B), such that the contact member 181 is secured to the front bar 183, the load cell cover 182 and the load cell 180.

When the contact member 181 is secured to the front bar 183, the central portion 230 of the contact member 181 may be positioned and dimensioned to substantially cover the front face 190 of the load cell 180 and the front face 221 of the front bar 183, and may cover the majority of the vertical front face 211 of the load cell cover 182. The central portion 230 is further dimensioned to not cover the inclined top face 210 of the load cell cover 182, which may allow debris falling onto the inclined top face 210 to slide off the load cell cover 182 and the contact member 181 by gravity for example. In the embodiment shown, the central portion 230 may have a width 235 of approximately 41.3 mm (or approximately 1.63 inches), a length 236 of approximately 161.92 mm (or approximately 6.38 inches), and a thickness of approximately 12.7 mm (or approximately 0.5 inches). In other embodiments, the width 235 and the length 236 of the central portion 230 may vary depending on the width and the length of the load cell cover 182 (which in turn depends on the width and length of the load cell 180 as noted above).

Further, when the contact member 181 is secured to the front bar 183, the first and second side portions 231 and 232 of the contact member 181 may extend to substantially entirely cover sides of the front bar 183, partially cover the first and second side faces 212 and 213 of the load cell cover 182, and partially cover the first and second side faces 192 and 193 of the load cell 180 (best shown in FIG. 5B). The combination of first and second side portions 231 and 232 extending from the central portion 230 may securely couple the contact member 181 to the front bar 183, the load cell cover 182 and the load cell 180, and may allow the contact member 181 to be deflected towards the spacing wall 64 in response to the load applied by the inner side 50 of the belt 22, rather than to be repositioned relative to the front bar 183, the load cell cover 182 or the load cell 180 in response to the load.

The level of deflection of the contact member 181 may depend on the level of load applied to the contact surface 233 by the inner side 50 of the belt 22 in contact with the contact surface 233, and the level of load applied by the inner side 50 of the belt 22 may be proportional to the tension in the portion of the belt 22 in contact with the contact surface 233 (described in greater detail below). For example, a belt 22 with high tension may apply a greater load than a belt 22 with low tension and may cause a greater level of deflection. Additionally, the point of contact between the inner side 50 of the belt 22 and the contact surface 233 along the length 236 of the contact member 181 may vary depending on tension in the belt 22. For example, a belt 22 with high tension may contact the contact surface 233 at a higher point along the length 236 than a belt 22 with low tension. The intake belt sensor 170 may be positioned on the spacing wall 64 and dimensioned such that a portion of the contact surface 233 covering and proximate the upper portion 194 is operable to contact the inner side 50 of a portion of the belt 22 in the first tier 45 when the tension in this portion of the belt 22 is both at a lower end and at a higher end of the pre-defined range.

As the contact member 181 is secured together with the front bar 183, the load cell cover 182 and the load cell 180 via the fasteners 215a and 215b, deflection of the contact member 181 is transferred into deflection of the front bar 183, and then deflection of the load cell cover 182 and then finally deflection of the upper portion 194 of the load cell 180 to generate the intake belt signal 440. A greater level of deflection of the contact member 181 is transferred into a greater level of deflection of the upper portion 194, thereby causing the load cell 180 to generate a belt signal indicative of the greater deflection. Further, as noted above, due to the properties (such as the material, the thickness 222, the length or the width) of the front bar 183 which enable uniform deflection, the load applied to the contact surface 233 may be transferred to the upper portion 194 substantially uniformly regardless of the point of contact along the length 236 between the belt 22 and the contact surface 233.

The intake belt sensor 170 may protrude from the spacing wall 64 a greater distance than the frame members 63 (having the drive bar 73 mounted thereon) adjacent to the intake belt sensor 170. For example, the intake belt sensor 170 may have a maximum extension distance 240 (shown in FIGS. 5B and 6) of approximately 60.34 mm (or approximately 2.38 inches) from the front surface 67 of the spacing wall 64 to the contact surface 233 of the contact member 181, whereas the frame members 63 adjacent to the intake belt sensor 170 may have a maximum extension distance 241 (shown in FIGS. 5B and 6) of 6 cm from the front surface 67. The greater extension distance 240 of the intake belt sensor 170 relative to the extension distance 241 of the frame members 63 allows the intake belt sensor 170 to protrude into the inner side 50 of the belt 22 during operation of the conveyor system 20 as the drum 24 rotates, and allows the contact surface 233 of the intake belt sensor 170 to be in substantially continuous contact with the inner side 50 of a portion of the belt 22 while that portion remains in the first tier 45.

As noted above, the inner side 50 of the belt 22 in contact with the contact surface 233 exerts a load onto the contact surface 233 proportional to a tension in that particular portion of the belt 22. For example, if the tension in that portion of the belt 22 is low, the inner side 50 of that portion of the belt 22 may exert a small load onto the contact surface 233, but if the tension in that portion of the belt 22 is high, the inner side 50 of that portion of the belt 22 may exert a large load on the contact surface 233. Further, due to the substantially continuous contact between the contact surface 233 and the inner side 50 of a portion of the belt 22 in first tier 45, if tension in that portion of the belt 22 changes as it travels through the first tier 45 (such as due to changes in the speeds or rotational directions of drum 24, intake roller 130 and discharge roller 131, or changes to distribution of a load on the conveying portion 52 for example), the load exerted onto the contact surface 233 would also change. Additionally, where the tension in the belt 22 is such that the belt 22 is skipping or surging, the inner side 50 of the portion of the belt 22 in the first tier 45 may intermittently lose or reduce contact with the contact surface 233 due to a skipping or surging event.

As also noted above, the load applied by the portion of the belt 22 to the contact surface 233 causes a proportional deflection of the contact member 181, which is transferred into a proportional deflection of the upper portion 194 of the load cell 180, which in turn causes the load cell 180 to generate a proportional intake belt signal 440. As such, when tension in the portion of the belt 22 in the first tier 45 is low (resulting in the load applied by the belt 22 to the contact surface 233 being similarly low), the belt signal 440 generated by the load cell 180 is a low load signal representing the low tension. When the tension in that portion of the belt 22 is high (resulting in the load applied by the belt 22 to the contact surface 233 being similarly high), the belt signal 440 generated by the load cell 180 may be a high load signal representing the high tension. Where the inner side 50 of the portion of the belt 22 in the first tier 45 loses contact with the contact surface 233 (such as where the belt 22 intermittently loses contact with the intake belt sensor 170 due to a skipping or surging event for example), the belt signal 440 generated by the load cell 180 may be a no load signal representing no tension sensed. Further, as noted above, where the inner side 50 of the portion of the belt 22 in the first tier 45 is in substantially continuous contact with the contact surface 233, that particular portion of the belt 22 may exert a substantially continuous load on the contact surface 233 until that particular portion exits the first tier 45. This substantially continuous load results in a substantially continuous deflection of the load cell 180 and generation of a plurality of intake belt signals 440 which correspond to a current tension in that particular portion of the belt 22. In certain embodiments, the load cell 180 may continuously generate real-time intake belt signals 440 representing tension in the belt 22 in real-time. The wireless transmitter 185 may transmit the real-time intake belt signals 440 to the control system 400 in real-time (as the real-time intake belt signals 440 are generated) or as a batch at specific intervals. In other embodiments, the load cell 180 may generate intermittent intake belt signals 440, such as every 1 ms, every 1 s, every 5 s, every 10 s, every 30 s or every 1 min for example, which represent tension in the belt 22 at that specific point in time. This intermittent generation of intake belt signals 440 may conserve a power source of the intake belt sensor 170. The wireless transmitter 185 may transmit the intermittent intake belt signals 440 to the control system 400 as the intermittent intake belt signals 440 are generated, or as a batch at specific intervals.

The wireless transmitter 185 may then wirelessly transmit the belt signal(s) 440 generated by the load cell 180 to the control system 400 (shown in FIG. 7). The wireless transmitter 185 and the load cell 180 may be powered by a rechargeable battery (not shown), such that the intake belt sensor 170 is a wireless sensor, without any wires connecting the intake belt sensor 170 to a power source for example. This wireless configuration can allow the intake belt sensor 170 to freely rotate with the drum 24 during operation of the conveyor system 20.

Referring back to FIG. 2, in some embodiments (not shown) to provide relatively greater accuracy for measuring tension in the belt 22 in the first tier 45, the conveyor system 20 may include a plurality of intake belt sensors 170 mounted to the periphery 62 of the drum 24 near the lower end 33 which receive the portion of the belt 22 that forms the first tier 45. For example, in certain embodiments (not shown), the conveyor system 20 may include two intake belt sensors 170, each mounted to one of two spacing walls 64 at diametrically opposed half points along the periphery 62 (such as at positions corresponding to 12:00 and 6:00 clock positions for example), which contact, and sense the tension in, two different portions of the belt 22 in the first tier 45. In other embodiments (not shown), the conveyor system 20 may include four intake belt sensors 170, each mounted to one of four spacing walls 64 at quarter points along the periphery 62 (such as at positions corresponding to 12:00, 3:00, 6:00 and 9:00 clock positions for example), which contact, and sense the tension in, four different portions of the belt 22 in the first tier 45. In yet other embodiments (not shown), the conveyor system 20 may include a plurality of intake belt sensors 170 mounted to each spacing wall 64 between each frame member 63, which contact a plurality of different portions of the belt 22 in the first tier 45. The intake belt signals 440 generated by the plurality of intake belt sensors 170 may be transmitted by respective wireless transmitters 185 of the intake belt sensors 170 to the control system 400.

Referring back to FIG. 2, in the embodiment shown, the discharge belt sensor 171 is mounted to the periphery 62 of the drum 24 near the upper end 34 of the drum 24 on a portion of the periphery 62 which would engage the portion of the belt 22 that forms the final tier 46 of the conveyor stack 41 as the belt 22 moves from the conveyor stack 41 into the discharge region 43. This positioning may allow the discharge belt sensor 171 to contact and to measure tension in a portion of the belt 22 in the final tier 46 and proximate the discharge region 43. Similar to the intake belt sensor 170, as the discharge belt sensor 171 is associated with the drum 24, the discharge belt sensor 171 will rotate with the drum 24 to substantially continuously contact and move with a particular portion of the belt 22 in the final tier 46 as that particular portion of the belt 22 rotates with the drum 24. However, as that particular portion of the belt 22 exits the final tier 46 to enter the discharge region 43, the discharge belt sensor 171 remains at the periphery 62 near the upper end 34 of the drum 24 and will contact and move with a subsequent portion of the belt 22 which now enters final tier 46.

The discharge belt sensor 171 may have structures and components substantially identical to the intake belt sensor 170 described above, and may include a load cell, a contact member having a contact surface, a load cell cover, a front bar, a back spacer, and a wireless transmitter. In other embodiments, the discharge belt sensor 171 may include more or fewer components and may include more or fewer components when compared to the intake belt sensor 170. In yet other embodiments, the discharge belt sensor 171 may be a completely different sensor than intake belt sensor 170 and may comprise any other sensor operable to measure the tension in a portion of the belt 22 which forms the final tier 46.

In the embodiment shown in FIG. 2, the discharge belt sensor 171 is identical to the intake belt sensor 170 described above. Additionally, similar to the intake belt sensor 170, the discharge belt sensor 171 mounted to the spacing wall 64 extending between two frame members 63. In other embodiments where the drum 24 does not include the spacing walls 64, the at least one discharge belt sensor 171 may be mounted to a tab or other flap (not shown) extending from the first side or the second side of a frame member 63. Also similar to the intake belt sensor 170, the discharge belt sensor 171 may protrude from the spacing wall 64 a greater distance than the frame members 63 (having the drive bar 73 mounted thereon) adjacent to the discharge belt sensor 171. This greater extension distance allows the discharge belt sensor 171 to protrude into the inner side 50 of the belt 22 as the drum 24 rotates, and for the contact surface of the discharge belt sensor 171 (similar to the contact surface 233 of the intake belt sensor 170) to be in substantially continuous contact with the inner side 50 of a particular portion of the belt 22 in the final tier 46 while that portion of the belt 22 remains in the final tier 46.

The inner side 50 of the portion of the belt 22 in contact with the contact surface of the discharge belt sensor 171 then exerts a load onto the contact surface proportional to a tension in that particular portion of the belt 22. Further, due to the substantially continuous contact between the contact surface and the inner side 50 of that portion of the belt 22, if tension in that portion of the belt 22 changes as it travels through the final tier 46, the load exerted onto the contact surface would also proportionally change. Additionally, where the tension in the belt 22 is such that the belt 22 is skipping or surging, the inner side 50 of the portion of the belt 22 in the final tier 46 may intermittently lose or reduce contact with the contact surface due to a skipping or surging event, and not exert any load on the contact surface.

Again similar to the intake belt sensor 170, the load applied by the portion of the belt 22 to the contact surface of the discharge belt sensor 171 causes a proportional deflection of the load cell of the discharge belt sensor 171 (similar to the load cell 180 of the intake belt sensor 170), which in turn causes the load cell to generate a proportional discharge belt signal 441 (shown in FIG. 7). For example, when tension in the portion of the belt 22 in the final tier 46 is low (resulting in the load applied by the belt 22 to the contact surface of the discharge belt sensor 171 being similarly low), the belt signal 441 generated by the load cell of the discharge belt sensor 171 is a low load signal representing the low tension. When tension in that portion of the belt 22 is high (resulting in the load applied by the belt 22 to the contact surface of the discharge belt sensor 171 being similarly high), the belt signal 441 generated by the load cell may be a high load signal representing the high tension. Where the inner side 50 of the portion of the belt 22 in the final tier 46 loses contact with the contact surface (such as where the belt 22 intermittently loses contact with the discharge belt sensor 171 due to a skipping or surging event for example), the belt signal 441 generated by the load cell of the discharge belt sensor 171 may be a no load signal representing no tension sensed. Additionally, as noted above, as the inner side 50 of the portion of the belt 22 in the final tier 46 is in substantially continuous contact with the contact surface of the discharge belt sensor 171, that particular portion of the belt 22 exerts a substantially continuous load on the contact surface until that particular portion exits the final tier 46. The substantially continuous load results in a substantially continuous deflection of the load cell of the discharge belt sensor 171 and generation of a plurality of discharge belt signals 441 which correspond to a current tension in that particular portion of the belt 22. In certain embodiments, the load cell of the discharge belt sensor 171 may continuously generate real-time discharge belt signals 441 representing tension in the belt 22 in real-time or may generate intermittent discharge belt signals 441 which represent tension in the belt 22 at a specific point in time. The wireless transmitter of discharge belt sensor 171 (similar to the wireless transmitter 185 of the intake belt sensor 170) may transmit the real-time discharge belt signals 441 or the intermittent discharge belt signals 441 to the control system 400 as the discharge belt signals 441 are generated, or as a batch at specific intervals.

In some embodiments (not shown) to provide greater accuracy in measuring tension in the belt 22 in the final tier 46 of the conveyor stack 41, the conveyor system 20 may include a plurality of discharge belt sensors 171 mounted to the periphery 62 of the drum 24 near the upper end 34 which receives the portion of the belt 22 that currently forms the final tier 46. For example, in certain embodiments (not shown), the conveyor system 20 may include two discharge belt sensors 171, each mounted to one of two spacing walls 64 at diametrically opposed half points along the periphery 62 (such as at positions corresponding to 12:00 and 6:00 clock positions for example), which contact, and sense the tension in, two different portions of the belt 22 in the final tier 46. In other embodiments (not shown), the conveyor system 20 may include four discharge belt sensors 171, each mounted to one of four spacing walls 64 at quarter points along the periphery 62 (such as at positions corresponding to 12:00, 3:00, 6:00 and 9:00 clock positions for example), which contact, and sense the tension in, four different portions of the belt 22 in the final tier 46. In yet other embodiments (not shown), the conveyor system 20 may include a plurality of discharge belt sensors 171 mounted to each spacing wall 64 between each frame member 63, which contact a plurality of different portions of the belt 22 in the final tier 46. The discharge belt signals 441 generated by the plurality of discharge belt sensors 171 may be transmitted by the respective transmitters of the discharge belt sensors 171 to the control system 400.

Referring now to FIG. 7, an embodiment of the control system for providing feedback control of the conveyor system 20 is shown generally at 400. The control system 400 includes a controller 401 and a motor controller 402. The controller 401 may be a programmable logic controller (PLC) or another programmable device. The motor controller 402 may be a variable-frequency drive.

The controller 401 comprises a receiver operable to receive the intake belt signals 440 transmitted by the wireless transmitter 185 of the at least one intake belt sensor 170. The intake belt signals 440 represent a tension in a portion of the belt 22 in the first tier 45 of the conveyor stack 41 as measured by the at least one intake belt sensor 170. The receiver of the controller 401 is further operable to receive discharge belt signals 441 transmitted by the wireless transmitter of the at least one discharge belt sensor 171. The discharge belt signals 441 represent a tension in a portion of the belt 22 in the final tier 46 of the conveyor stack 41 as measured by the at least one discharge belt sensor 171. The combination of the intake and discharge belt signals 440 and 441 can allow the controller 401 to generally determine a tension in the belt 22 as the belt 22 transitions from the substantially linear configuration in the intake region 40 into the curved configuration of the conveyor stack 41, and transitions out of the curved configuration of the conveyor stack 41 back into the substantially linear configuration in the discharge region 43, and how tension in the belt 22 changes as the belt 22 travels through the conveyor stack. Such transition zones may correspond to areas of high tension in the belt 22 or areas where belt skipping often occur.

The controller 401 further receives the drum motor signals 410 transmitted by the drum motor sensor 124. The drum motor signals 410 represent an operating variable of the drum motor 121 or of the drum 24 as measured by the drum motor sensor 124, which in turn represents a speed and rotational direction at which the drum 24 is driven by the drum motor 121. The controller 401 further receives the intake motor signals 420 transmitted by the intake motor sensor 144. The intake motor signals 420 represent an operating variable of the intake motor 141 or of the intake roller 130 as measured by the intake motor sensor 144, which in turn represents a speed and rotational direction at which the intake roller 130 is driven by the intake motor 141. Finally, the controller 401 further receives the discharge motor signals 430 transmitted by the discharge motor sensor 154. The discharge motor signals 430 represent an operating variable of the discharge motor 151 or of the discharge roller 131 as measured by the discharge motor sensor 154, which in turn represents a speed and rotational direction at which the discharge roller 131 is driven by the discharge motor 151.

The controller 401 may be configured to monitor one or more of the intake belt signals 440, the discharge belt signals 441, the drum motor signals 410, the intake motor signals 420, and the discharge motor signals 430. One or more of the belt signals 440 and 441 and the motor signals 410, 420 and 430 can allow the controller 401 to determine the effect of the speed and direction of the rotation of the drum 24, intake roller 130 and discharge roller 131 on tension in the belt 22 in the first tier 45 and on tension in the belt 22 in the final tier 46. As noted above, the tension in the belt 22 may need to be adjusted during operation of the conveyor system 20 to maintain the tension with in a pre-defined range, to prevent belt surging and belt skipping, and to prevent belt sagging, slipping and entanglement.

The controller 401 may further be configured to transmit a motor control signal 404 to the motor controller 402 configured to adjust one or more of the drum motor 121, the intake motor 141 and the discharge motor 151, to generally maintain the tensions in the belt 22 with in the pre-defined range for the operation of the belt 22, to correct any belt surging in the belt 22, and/or to ensure that the belt 22 firmly engages with and easily disengages from the drum 24. Motor controller 402 may then transmit the adjustments contained in the motor control signal 404 to the drum motor 121 in the drum motor adjustment signal 411, to the intake motor 141 in the intake motor adjustment signal 421 and to the discharge motor 151 in the discharge motor adjustment signal 431.

The drum motor adjustment signal 411 can direct the drum motor 121 to increase or decrease its speed, which increases or decreases speed of rotation of the drum 24 and correspondingly affects a travel speed of the belt 22 through the conveyor system 20 (and in particular through the conveyor stack 41). The drum motor adjustment signal 411 can also direct the drum motor 121 to change the direction of rotation of the drum 24 from the clockwise direction 122 to the counter-clockwise direction 123 or vice versa, which correspondingly affects a direction of the travel path of the belt 22. The intake motor adjustment signal 421 can direct the intake motor 141 to increase or decrease speed, which increases or decreases the speed of rotation of the intake roller 130 and correspondingly affects the travel speed of the belt 22 through the conveyor system 20 (and in particular through the intake region 40). The intake motor adjustment signal 421 can also direct the intake motor 141 change the direction of rotation of the intake roller 130 from the clockwise direction 142 to the counter-clockwise direction 143 or vice versa, which correspondingly affects a direction of the travel path of the belt 22. The discharge motor adjustment signal 431 can direct the discharge motor 151 to increase or decrease speed, which increases or decreases the speed of rotation of the discharge roller 131 and correspondingly affects the travel speed of the belt 22 through the conveyor system 20 (and in particular through the discharge region 43). The discharge motor adjustment signal 431 can also direct the discharge motor 151 change in the direction of rotation of the discharge roller 131 from the clockwise direction 152 to the counter-clockwise direction 153, which correspondingly affects a direction of the travel path of the belt 22.

The controller 401 may be configured to send the motor control signal 404 to the motor controller 402 in response to one or more of the intake belt signals 440 from the at least one intake belt sensor 170 and the discharge belt signals 441 from the at least one discharge belt sensor 171, as well as the motor signals 410, 420 and 430 from, respectively, the drum motor sensor 124, the intake motor sensor 144 and the discharge motor sensor 154.

For example, in embodiments where the travel path of the belt 22 is in the direction from the intake region 40 to the conveyor stack 41 to the discharge region 43 (such that the intake roller 130 rotates in the clockwise direction 142, the drum 24 rotates in the counter-clockwise direction 123, and the discharge roller 131 rotates in the clockwise direction 152), in response to intake belt signals 440 from the intake belt sensor 170 indicating high tension in the portion of the belt 22 in the first tier 45, or some other indication of belt skipping relative to the drum 24 when the belt 22 transitions from the intake region 40 into the conveyor stack 41 (such as if the intake belt signals 440 indicate alternating high tension and no tension in that portion of the belt 22 in the first tier 45, which in turn indicates intermittent contact of a belt at high tension with the intake belt sensor 170 for example), the controller 401 may send a motor control signal 404 to the motor controller 402 to generate and transmit one or more of the following adjustment signals, which may reduce tension in the portions of the belt 22 within the intake region 40 and the first tier 45:

an intake motor adjustment signal 421 to direct the intake motor 141 to increase a speed of the intake roller 130; and a drum motor adjustment signal 411 to direct the drum motor 121 to decrease a speed of the drum 24; and a discharge motor adjustment signal 431 to direct the discharge motor 151 to decrease a speed of the discharge roller 131.

Alternatively, in response to intake belt signals 440 from the intake belt sensor 170 indicating low tension in the portion of the belt 22 in the first tier 45 or some other indication that the belt 22 is experiencing belt surging or slipping in the intake region 40 (such as if the intake belt signals 440 indicate alternating low tension and no tension in that portion of the belt 22 in the first tier 45, which in turn indicates intermittent contact of a belt at low tension with the intake belt sensor 170 for example), the controller 401 may send a motor control signal 404 to the motor controller 402 to generate and transmit one or more of the following adjustment signals, which may increase tension in the portion of the belt 22 within the intake region 40 and the first tier 45:

an intake motor adjustment signal 421 to direct the intake motor 141 to decrease a speed of the intake roller 130;

a drum motor adjustment signal 411 to direct the drum motor 121 to increase a speed of the drum 24; and a discharge motor adjustment signal 431 to the discharge motor 151 to increase a speed of the discharge roller 131.

Alternatively, in response to discharge belt signals 441 from the discharge belt sensor 171 indicating high tension in the portion of the belt 22 in the final tier 46, or some other indication of belt skipping relative to the drum 24 when the belt 22 transition from the conveyor stack 41 to the discharge region 43, the controller 401 may send a motor control signal 404 to the motor controller 402 to generate and transmit one or more of the following adjustment signals, which may reduce tension in the portion of the belt 22 in the final tier 46 and the discharge region 43:

an intake motor adjustment signal 421 to direct the intake motor 141 to increase a speed of the intake roller 130;

a drum motor adjustment signal 411 to direct the drum motor 121 to increase a speed of the drum 24; and a discharge motor adjustment signal 431 to the discharge motor 151 to decrease a speed of the discharge roller 131.

Alternatively still, in response to discharge belt signals 441 from the discharge belt sensor 171 indicating low tension in the portion of the belt 22 in the final tier 46, or some other indication of that the belt 22 is experiencing belt surging or slipping in the discharge region 43, the controller 401 may send a motor control signal 404 to the motor controller 402 to generate and transmit one or more of the following adjustment signals, which may increase tension in the portion of the belt 22 in the final tier 46 and the discharge region 43:

an intake motor adjustment signal 421 to direct the intake motor 141 to decrease a speed of the intake roller 130;

a drum motor adjustment signal 411 to direct the drum motor 121 to decrease a speed of the drum 24; and a discharge motor adjustment signal 431 to the discharge motor 151 to increase a speed of the discharge roller 131.

The controller 401 may further be configured to monitor the motor signals 410, 420 and 430 from the drum motor sensor 124, the intake motor sensor 144 and the discharge motor sensor 154 after transmission of the adjustment signals 411, 421 and 431 and determine whether the speeds generated by the drum motor 121, the intake motor 141 and the discharge motor 151 have been appropriately increased or decreased in response to the adjustment signals 411, 421 and 431. The controller 401 may send further motor control signals 404 to the motor controller 402 for generating and transmitting additional adjustment signals 411, 421 and 431 to further adjust the speeds of the intake roller 130, the drum 24 and the discharge roller 131 based on the determined change in speed of the components. The controller 401 may also be configured to monitor the intake belt signals 440 and the discharge belt signals 441 after transmission of the adjustment signals 411, 421 and 431 to monitor a relationship between change in speed of one or more of the intake roller 130, drum 24 and discharge roller 131 and change in tension in the portion of the belt 22 in the first tier 45 and the portion of the belt in the final tier 46. The controller 401 may send further motor control signals 404 to the motor controller 402 for generating and transmitting additional adjustment signals 411, 421 and 431 to further adjust the speeds of the intake roller 130, the drum 24 and the discharge roller 131 based on the monitored change in tensions of the belt 22.

The embodiments described above may facilitate more sensitive and responsive systems for adjusting and maintaining tension of belting in a conveyor system, and particularly belting in a helical conveyor system where the belt transitions from a substantially linear configuration in intake and discharge regions to a substantially curved configuration in a conveyor stack around a driving drum, and vice versa. Embodiments such as those described above may use one or more belt sensors mounted to the drum proximate the intake region and one or more belt sensors mounted to the drum proximate the discharge region to sense tension in the belt as the belt transitions into, and exits, the conveyor stack. The sensed tension may then be used to control a driving speed and driving direction of one or more of (a) at least one motorized intake roller in the intake region, (b) the driving drum, and (c) at least one motorized discharge roller in the discharge region, to generally maintain tension in the belt within an operating range and to reduce or address belt surging, belt skipping and belt sagging and slipping for example.

While the present subject matter has been described above in connection with illustrative embodiments, as shown in the various figures, it is to be understood that other similar embodiments may be used or modifications and additions may be made to the described embodiments for performing the same function without deviating therefrom. Further, all embodiments disclosed are not necessarily in the alternative, as various embodiments may be combined to provide the desired characteristics. While specific embodiments have been described and illustrated, such embodiments should be considered illustrative of the subject matter described herein and not as limiting the claims as construed in accordance with the relevant jurisprudence.

The invention claimed is:

1. A method for controlling tension in a belt of a helical conveyor system, the method comprising:
   driving the belt along a helical path about a rotatable drum from an intake region to a discharge region using an intake motor adjacent the intake region and a discharge motor adjacent the discharge region;
   measuring a tension in the belt using an intake belt sensor mounted to a periphery of the rotatable drum and which rotates with the rotatable drum and moves with the belt proximate the intake region to generate an intake belt signal;
   measuring a tension in the belt using a discharge belt sensor mounted to the periphery of the rotatable drum and which rotates with the rotatable drum and moves with the belt proximate the discharge region to generate a discharge belt signal;
   monitoring the intake belt signal and the discharge belt signal; and
   adjusting at least one of the intake motor and the discharge motor based on the intake belt signal and the discharge belt signal to maintain the tensions in the belt within a predefined range.

2. The method of claim 1, further comprising:
   measuring an operating variable of the intake motor to generate an intake motor signal;
   measuring an operating variable of the discharge motor to generate a discharge motor signal; and
   monitoring the intake motor signal and the discharge motor signal, wherein adjusting the at least one of the intake motor and the discharge motor is further based on at least one of the intake motor signal and the discharge motor signal.

3. The method of claim 1, wherein adjusting the at least one of the intake motor and the discharge motor comprises adjusting the at least one of the intake motor and the discharge motor to reduce at least one of belt surging and belt skipping in the helical path.

4. The method of claim 1, wherein adjusting the at least one of the intake motor and the discharge motor comprises controlling a speed of the at least one of the intake motor and the discharge motor.

5. The method of claim 1, wherein the intake belt sensor moves with the belt proximate the intake region by moving with a first tier of the belt of a plurality of tiers of the belt and the discharge belt sensor moves with the belt proximate the discharge region by moving with a final tier of the belt of the plurality of tiers of the belt.

6. The method of claim 1, wherein driving the belt along the helical path about the rotatable drum further comprises using a drum motor to rotate the rotatable drum about a vertical axis.

7. The method of claim 6, further comprising adjusting at least one of the drum motor, the intake motor and the discharge motor based on the intake belt signal and the discharge belt signal to maintain the tensions in the belt within the predefined range.

8. The method of claim 7, further comprising:
   measuring an operating variable of at least one of the drum motor and of the rotatable drum to generate a drum motor signal; and
   monitoring the drum motor signal, wherein adjusting the at least one of the drum motor, the intake motor and the discharge motor is based on the drum motor signal.

9. The method of claim 1, wherein one of the intake motor and the discharge motor is operable to push the belt toward the rotatable drum and another of the intake motor and the discharge motor is operable to pull the belt from the rotatable drum.

10. The method of claim 1, wherein:
    each belt sensor of the intake belt sensor and the discharge belt sensor comprises a load cell and a contact member, and
    measuring the tensions in the belt comprises measuring a force applied by a side of the belt to the contact member with the load cell as that belt sensor moves with the belt during rotation of the rotatable drum.

11. The method of claim 1, wherein generating the intake belt signal and the discharge belt signal comprises generating wireless belt signals.

12. The method of claim 11, wherein monitoring the intake belt signal and the discharge belt signal comprises receiving the wireless belt signals at a control system.

13. The method of claim 1, wherein measuring the tension in the belt using the intake belt sensor comprises measuring the tension in the belt using a plurality of intake belt sensors.

14. The method of claim 1, wherein measuring the tension in the belt using the discharge belt sensor comprises measuring the tension in the belt using a plurality of discharge belt sensors.

15. A helical conveyor system comprising:
    a belt movable along a helical path about a rotatable drum from an intake region to a discharge region;
    an intake motor adjacent the intake region and a discharge motor adjacent the discharge region engageable with the belt to drive the belt along the helical path;
    an intake belt sensor mounted to a periphery of the rotatable drum for rotation with the rotatable drum and for movement with the belt proximate the intake region, wherein the intake belt sensor is configured to measure tension in the belt to generate an intake belt signal;

a discharge belt sensor mounted to the periphery of the rotatable drum for rotation with the rotatable drum and for movement with the belt proximate the discharge region, wherein the discharge belt sensor is configured to measure tension in the belt to generate a discharge belt signal; and a control system configured to:
receive the intake belt signal and the discharge belt signal;
generate adjustment signals configured to adjust at least one of the intake motor and the discharge motor based on the intake belt signal and the discharge belt signal to maintain the tensions in the belt within a predefined range; and
transmit the adjustment signals to the at least one of the intake motor and the discharge motor.

16. The system of claim 15, further comprising:
an intake motor sensor associated with the intake motor and configured to generate an intake motor signal based on an operating variable of the intake motor; and
a discharge motor sensor associated with the discharge motor and configured to generate a discharge motor signal based on an operating variable of the discharge motor.

17. The system of claim 16, wherein the adjustment signals are based on at least one of the intake motor signal and the discharge motor signal.

18. The system of claim 15, wherein the adjustment signals are further configured to adjust the at least one of the intake motor and the discharge motor based on the intake belt signal and the discharge belt signal to reduce at least one of belt surging and belt skipping in the helical path.

19. The system of claim 15, wherein the adjustment signals are further configured to adjust the at least one of the intake motor and the discharge motor by adjusting a speed of the at least one of the intake motor and the discharge motor.

20. The system of claim 15, wherein the intake belt sensor includes a transmitter configured to generate the intake belt signal as a wireless intake belt signal, the discharge belt sensor include a transmitter configured to generate the discharge belt signal as a wireless discharge belt signal and the control system includes a receiver configured to receive the wireless intake belt signal and the wireless discharge belt signal.

21. The system of claim 15, wherein the intake belt sensor is mounted to the periphery of the rotatable drum proximate a first tier of the belt of a plurality of tiers of the belt and the discharge belt sensor is mounted to the periphery of the rotatable drum proximate a final tier of the belt of the plurality of tiers of the belt.

22. The system of claim 15, further comprising a drum motor associated with the rotatable drum and configured to rotate the rotatable drum about a vertical axis.

23. The system of claim 22, wherein the adjustment signals are further configured to adjust at least one of the drum motor, the intake motor and the discharge motor to maintain the tensions in the belt within the predefined range.

24. The system of claim 23, further comprising a drum motor sensor associated with the drum motor which generates a drum motor signal based on an operating variable of at least one of the drum motor and of the rotatable drum, wherein the adjustment signals are further configured to adjust the at least one of the drum motor, the intake motor and the discharge motor is based on the drum motor signal.

25. The system of claim 15, wherein one of the intake motor and the discharge motor is operable to push the belt toward the rotatable drum and another of the intake motor and the discharge motor is operable to pull the belt from the rotatable drum.

26. The system of claim 15, wherein each belt sensor of the intake belt sensor and the discharge belt sensor comprises a load cell and a contact member configured to contact a side of the belt to measure a force applied by the side of the belt to the contact member with the load cell as that belt sensor moves with the belt during rotation of the rotatable drum.

27. The system of claim 26, wherein the contact member is formed from an UHMW plastic.

28. The system of claim 26, wherein a load cell cover is positioned between the load cell and the contact member.

29. The system of claim 28, wherein a front bar is positioned between the contact member and the load cell cover, and the front bar is formed of a material which uniformly deflects in response to the force applied by the side of the belt to the contact member.

30. The system of claim 26, wherein a lower portion of a rear face of the load cell is mounted to the drum and an upper portion of an opposite face of the load cell is mounted to the contact member.

31. The system of claim 15, further comprising a plurality of intake belt sensors, wherein the intake belt sensor comprises one of the plurality of intake belt sensors.

32. The system of claim 15, further comprising a plurality of discharge belt sensors, wherein the discharge belt sensor comprises one of the plurality of discharge belt sensors.

* * * * *